(12) United States Patent　　(10) Patent No.: US 9,135,358 B2
Campbell et al.　　(45) Date of Patent: Sep. 15, 2015

(54) RESULT TYPES FOR CONDITIONAL DATA DISPLAY

(75) Inventors: Jonathan Thomas Campbell, Redmond, WA (US); Zhenguang Chen, Sammamish, WA (US); Arun Krishnamoorthy, Sammamish, WA (US); Boxin Li, Sammamish, WA (US); Charles Reeves Little, II, Bellevue, WA (US); Charles Keller Smith, Seattle, WA (US); Viktoriya Taranov, Bellevue, WA (US); Brian William Timm, Seattle, WA (US); Andrew Joseph Violino, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 36 days.

(21) Appl. No.: 13/173,617

(22) Filed: Jun. 30, 2011

(65) Prior Publication Data

US 2012/0102024 A1　Apr. 26, 2012

Related U.S. Application Data

(60) Provisional application No. 61/405,067, filed on Oct. 20, 2010.

(51) Int. Cl.
*G06F 7/00*　　(2006.01)
*G06F 17/30*　　(2006.01)

(52) U.S. Cl.
CPC ...... *G06F 17/3089* (2013.01); *G06F 17/30424* (2013.01); *G06F 17/30477* (2013.01); *G06F 17/30554* (2013.01)

(58) Field of Classification Search
CPC .......... G06F 17/3053; G06F 17/30554; G06F 17/30424; G06F 17/30477
USPC ........................................................ 707/722
See application file for complete search history.

(56) References Cited

U.S. PATENT DOCUMENTS

| | | | |
|---|---|---|---|
| 5,043,891 | A | 8/1991 | Goldstein et al. |
| 5,579,467 | A | 11/1996 | Capps |
| 6,385,602 | B1 | 5/2002 | Tso et al. |
| 6,430,609 | B1 | 8/2002 | Dewhurst et al. |

(Continued)

FOREIGN PATENT DOCUMENTS

| | | |
|---|---|---|
| CN | 101091148 A | 12/2007 |
| CN | 101110073 A | 1/2008 |

(Continued)

OTHER PUBLICATIONS

"Autonomy Enterprise Search," http://www.searchtools.com/tools/autonomy.html, 3 pages (Aug. 1, 2005).

(Continued)

*Primary Examiner* — Mark E Hershley
(74) *Attorney, Agent, or Firm* — Tom Wong; Danielle Johnston-Holmes; Micky Minhas

(57) ABSTRACT

A set of user interfaces is provided to an administrator of a website. The user interfaces enable the administrator to configure search functionality of the website to present different types of search results differently. For instance, the administrator can use the user interfaces to configure the search functionality to present different properties for search results belonging to different result types.

20 Claims, 20 Drawing Sheets

(56) References Cited

U.S. PATENT DOCUMENTS

| | | | |
|---|---|---|---|
| 6,507,854 B1 | 1/2003 | Dunsmoir et al. | |
| 6,665,658 B1* | 12/2003 | DaCosta et al. | 1/1 |
| 6,826,594 B1 | 11/2004 | Pettersen | |
| 6,928,443 B1* | 8/2005 | Giambalvo | 1/1 |
| 6,931,591 B1 | 8/2005 | Brown et al. | |
| 6,976,028 B2 | 12/2005 | Fenton et al. | |
| 7,009,611 B2 | 3/2006 | Di Lelle | |
| 7,027,881 B2 | 4/2006 | Yumoto et al. | |
| 7,035,803 B1 | 4/2006 | Ostermann et al. | |
| 7,155,491 B1 | 12/2006 | Schultz et al. | |
| 7,178,101 B2 | 2/2007 | Tunning | |
| 7,233,956 B2* | 6/2007 | Balducci et al. | 1/1 |
| 7,469,378 B2 | 12/2008 | Nagahara et al. | |
| 7,496,233 B2 | 2/2009 | Kirihara et al. | |
| 7,548,334 B2 | 6/2009 | Lo et al. | |
| 7,565,630 B1 | 7/2009 | Kamvar et al. | |
| 7,577,561 B2 | 8/2009 | McEntee et al. | |
| 7,707,498 B2 | 4/2010 | Jones et al. | |
| 7,792,857 B1 | 9/2010 | Brette et al. | |
| 7,900,139 B2 | 3/2011 | Hosotsubo | |
| 7,979,458 B2 | 7/2011 | Zeller et al. | |
| 8,225,202 B2 | 7/2012 | Duncan et al. | |
| 8,296,643 B1 | 10/2012 | Vasilik | |
| 8,353,012 B2* | 1/2013 | Del Real | 726/4 |
| 8,359,364 B2 | 1/2013 | Bangalore et al. | |
| 8,364,709 B1 | 1/2013 | Das et al. | |
| 8,504,910 B2 | 8/2013 | Tarjan | |
| 8,584,002 B2 | 11/2013 | Cave et al. | |
| 8,954,428 B2 | 2/2015 | Chitiveli et al. | |
| 8,990,210 B2 | 3/2015 | Egnor et al. | |
| 2001/0032208 A1 | 10/2001 | Duxbury | |
| 2002/0029296 A1 | 3/2002 | Anuff et al. | |
| 2002/0147726 A1 | 10/2002 | Yehia et al. | |
| 2003/0009563 A1 | 1/2003 | Douglis et al. | |
| 2003/0115376 A1 | 6/2003 | Drobychev et al. | |
| 2003/0189585 A1 | 10/2003 | Forkner et al. | |
| 2003/0194689 A1 | 10/2003 | Kamasaka et al. | |
| 2004/0098704 A1 | 5/2004 | Becker et al. | |
| 2005/0097450 A1 | 5/2005 | Lumera et al. | |
| 2005/0138557 A1 | 6/2005 | Bolder et al. | |
| 2005/0179947 A1 | 8/2005 | Kobashi et al. | |
| 2005/0273705 A1 | 12/2005 | McCain | |
| 2006/0029125 A1 | 2/2006 | Kobashi et al. | |
| 2006/0050287 A1 | 3/2006 | Kobashi et al. | |
| 2006/0143561 A1 | 6/2006 | Balasubramanyan et al. | |
| 2006/0198555 A1 | 9/2006 | Hosotsubo | |
| 2006/0203294 A1 | 9/2006 | Makino | |
| 2006/0242578 A1 | 10/2006 | Van Steenbergen et al. | |
| 2007/0050477 A1 | 3/2007 | Isaacs | |
| 2007/0088695 A1 | 4/2007 | Bleyendaal et al. | |
| 2007/0089053 A1 | 4/2007 | Uhlig et al. | |
| 2007/0168335 A1 | 7/2007 | Moore et al. | |
| 2008/0066100 A1* | 3/2008 | Brodersen et al. | 725/35 |
| 2008/0162498 A1* | 7/2008 | Omoigui | 707/10 |
| 2008/0195936 A1 | 8/2008 | White et al. | |
| 2008/0235608 A1 | 9/2008 | Prabhu | |
| 2008/0256434 A1 | 10/2008 | Morris | |
| 2008/0282160 A1 | 11/2008 | Tonnison et al. | |
| 2009/0024874 A1 | 1/2009 | Proto | |
| 2009/0204590 A1 | 8/2009 | Yaskin et al. | |
| 2009/0254515 A1 | 10/2009 | Terheggen et al. | |
| 2009/0292986 A1 | 11/2009 | Anderson | |
| 2009/0307583 A1 | 12/2009 | Tonisson | |
| 2010/0037127 A1* | 2/2010 | Tomasic et al. | 715/224 |
| 2010/0070850 A1 | 3/2010 | Yamaji et al. | |
| 2010/0125797 A1 | 5/2010 | Lavi et al. | |
| 2010/0138100 A1 | 6/2010 | Kim et al. | |
| 2010/0145774 A1* | 6/2010 | Veshnyakov et al. | 705/12 |
| 2010/0153839 A1 | 6/2010 | Wilkins | |
| 2010/0162365 A1* | 6/2010 | Del Real | 726/4 |
| 2010/0169334 A1 | 7/2010 | Dos Santos | |
| 2010/0199173 A1 | 8/2010 | Morooka | |
| 2010/0228711 A1 | 9/2010 | Li et al. | |
| 2010/0250779 A1 | 9/2010 | B'Far et al. | |
| 2010/0287188 A1 | 11/2010 | Kakar | |
| 2010/0306249 A1* | 12/2010 | Hill et al. | 707/769 |
| 2011/0055687 A1 | 3/2011 | Bhandar et al. | |
| 2012/0036427 A1 | 2/2012 | Osaka et al. | |
| 2012/0072420 A1 | 3/2012 | Moganti et al. | |
| 2012/0072463 A1 | 3/2012 | Moganti et al. | |
| 2012/0102095 A1 | 4/2012 | Campbell et al. | |
| 2012/0102386 A1 | 4/2012 | Campbell et al. | |
| 2012/0278707 A1 | 11/2012 | Kadowaki et al. | |
| 2012/0310971 A1 | 12/2012 | Tran | |
| 2015/0074141 A1 | 3/2015 | Jones et al. | |

FOREIGN PATENT DOCUMENTS

| | | |
|---|---|---|
| CN | 101136765 A | 3/2008 |
| CN | 101815003 A | 8/2010 |

OTHER PUBLICATIONS

"Chapter 3: Customizing and Extending the Microsoft Office SharePoint 2007 Search (Part 1 of 2)," http://msdn.microsoft.com/en-us/library/bb608302%28v=office.12%29.aspx, 26 pages(Copyright 2010).

"Constellio: Enterprise Search," http://www.constellio.com/node/95, 2 pages (Copyright 2009).

"Coveo Expresso," http://www.coveo.com/en/products/coveo-expresso, 3 pages (Copyright 2010).

"Creating the Search Experience: Customizing the User Interface," http://code.google.com/apis/searchappliance/documentation/50/admin_searchexp/ce_user_interface.html #h2results, 21 pages (Posted: Oct. 2007).

"Customize the Search Results Page," http://drupal.org/node/175013, 10 pages (Last Modified: Nov. 24, 2009).

"FAST meets SharePoint—What's Coming in Search for SharePoint 2010," http://blogs.msdn.com/b/enterprisesearch/archive/2009/10/28/fast-meets-sharepoint-what-s -coming-in-search-for-sharepoint-2010.aspx, 4 pages (Oct. 27, 2009).

Aldrich, S., "Enterprise Search Evaluation: Endeca Information Access Platform V.5.1 Evalulation," http://www.psgroup.com/research_824.aspx, 4 pages (May 10, 2007).

Bennett, M., "First Look: IBM OmniFind Yahoo! Edition Search," http://www.ideaeng.com/tabId/98/itemId/134/First-Look-IBM-OmniFind-Yahoo-Edition-Search.aspx, 5 pages (Mar. 2009).

Benson, E., "A Data Aware Web Architecture," Master of Science Thesis, dspace.mit.edu/bitstream/handle/1721.1/60156/681746239.pdf, 89 pages (May 18, 2010).

Edwards, R., "Google Search Appliance 6.0," http://static.googleusercontent.com/external_content/untrusted_dlcp/www.google.com/en//enterprise/pdf/butler_tech_review.pdf, 8 pages (Jun. 2009).

Esposito, D., "ASP.NET AJAX and Client-Side Templates," *Cutting Edge*, http://msdn.microsoft.com/en-us/magazine/cc546561.aspx, 10 pages (Jun. 2008).

Hane, P., "X1 Offers Free Desktop Search for the Enterprise," http://newsbreaks.infotoday.com/nbreader.asp?ArticleID=16049, 2 pages (Jun. 19, 2006).

Tisseghem, P., "Customizing Search Results with Custom XSLTs in SharePoint Server 2007," http://msdn.microsoft.com/en-us/library/bb896018%28v=office.12%29.aspx, 4 pages (Dec. 2007).

U.S. Appl. No. 13/173,313, filed Jun. 30, 2011 entitled "Templates for Displaying Data".

U.S. Appl. No. 13/173,435, filed Jun. 30, 2011 entitled "Customization of Display Templates".

Crew, EP1524607A2, publication date Apr. 20, 2005.

Hua et al., LazyCut—Content-Aware Template-Based Video Authoring, ACM 2005, pp. 792-793.

Noy et al., Creating Semantic Web Contents with Protege—2000, IEEE 2001, pp. 60-71.

Office Action mailed Dec. 5, 2012, in co-pending U.S. Appl. No. 13/173,435.

International Search Report and Written Opinion cited in International Application No. PCT/US2011/056974 mailed Apr. 10, 2012.

Aubrecht et al., Metadata Driven Data Transformation, Google 2005, pp. 1-5.

(56) References Cited

OTHER PUBLICATIONS

Office Action mailed Aug. 14, 2013, in co-pending U.S. Appl. No. 13/173,435.
Office Action mailed May 7, 2913, in co-pending U.S. Appl. No. 13/173,435.
Office Action mailed Jun. 20, 2013, in co-pending U.S. Appl. No. 13/173,313.
Chinese 2nd Office Action in Application 201110340009.3, mailed Jun. 30, 2014, 13 pgs.
U.S. Appl. No. 13/173,435, Amendment and Response filed Jul. 25, 2014, 20 pgs.
Chinese 1st Office Action in Application 201110339620.4, mailed Mar. 3, 2014, 6 pgs.
Chinese 1st Office Action in Application 201110340009.3, mailed Dec. 20, 2013, 10 pgs.
Chinese 1st Office Action in Application 201110340054.9, mailed Jan. 15, 2014, 10 pgs.
U.S. Appl. No. 13/173,313, Amendment and Response filed Nov. 20, 2013, 19 pgs.
U.S. Appl. No. 13/173,313, Office Action mailed Apr. 9, 2014, 31 pgs.
U.S. Appl. No. 13/173,435, Amendment and Response filed Dec. 16, 2013, 19 pgs.
U.S. Appl. No. 13/173,435, Amendment and Response filed Mar. 5, 2013, 17 pgs.
U.S. Appl. No. 13/173,435, Amendment and Response filed Aug. 7, 2013, 21 pgs.
U.S. Appl. No. 13/173,435, Office Action mailed Mar. 25, 2014, 28 pgs.
"Third Office Action Issued in China Patent Application No. 201110340054.9", Mailed Date: Mar. 20, 2015, 10 Pages.
U.S. Appl. No. 13/173,313, Amendment and Response filed Aug. 11, 2014, 14 pgs.
U.S. Appl. No. 13/173,435, Office Action mailed Sep. 18, 2014, 28 pgs.
Cheng et al., "Dynamic Ad Layout Revenue Optimization for Display Advertising", ACM 2012, pp. 1-9.
Nebeling et al., "Adaptive Layout Template for Effective Web Content Presentation in Large-Screen Contexts", ACM 2011, pp. 219-228.
Chinese 2nd Office Action in Application 201110339620.4, mailed Nov. 2, 2014, 10 pgs.
Chinese 2nd Office Action in Application 201110340054.9, mailed Sep. 12, 2014, 7 pgs.
Chinese 3rd Office Action in Application 201110340009.3, mailed Jan. 13, 2015, 8 pgs.
U.S. Appl. No. 13/173,435, Amendment and Response filed Dec. 18, 2014, 19 pgs.
Chinese 3rd Office Action in Application 201110339620.4, mailed May 20, 2015, 6 pgs.
U.S. Appl. No. 13/173,435, Notice of Allowance mailed Apr. 20, 2015, 6 pgs.
Zhao, Hongkun et al., "Fully Automatic Wrapper Generation for Search Engines", ACM 2005, pp. 66-75.
U.S. Appl. No. 13/173,435, Notice of Allowance mailed May 4, 2015, 2 pgs.
U.S. Appl. No. 13/173,313, Office Action mailed Jul. 6, 2015, 28 pgs.

\* cited by examiner

RESULT TYPES FOR CONDITIONAL DATA DISPLAY

CROSS REFERENCE TO RELATED APPLICATIONS

This application claims priority to U.S. Provisional Patent Application Ser. No. 61/405,067, filed Oct. 20, 2010, the entire content of which is hereby incorporated by reference, and is related to U.S. patent application Ser. No. 13/173,435, titled "Customization of Display Templates," filed on Jun. 30, 2011, and U.S. patent application Ser. No. 13/173,313, titled "Templates for Displaying Data," filed on Jun. 30, 2011, the entirety of each of which is incorporated by reference herein.

BACKGROUND

Websites can include large numbers of resources. The resources in a website can belong to various types. For example, a website can include webpages, word processor documents, PDF documents, slide presentation documents, spreadsheet documents, audio files, video files, and other types of resources.

Because websites can have large numbers of resources, websites frequently include search functionality that enables users to search for desired resources. The search functionality allows a user to provide a search string. Upon receiving the search string, the search functionality identifies search results. The search results are resources in the website that satisfy the search string. After identifying the search results, the search functionality presents a search results interface. The search results interface contains information about the search results. Typically, the search results interface contains the same types of information about search results and presents the information about the search results in the same way, even if the search results belong to different types.

SUMMARY

An administrator uses a set of user interfaces to configure a search functionality of a website to present different types of search results in different ways. For instance, the administrator is able to configure the search functionality to display different properties of search results belonging to different result types. Providing different information for different types of search results can help users find desired resources more quickly. Furthermore, because the administrator is able to use the user interfaces to configure the search functionality, it may be unnecessary for the administrator to edit formal programming language code in order to configure the search functionality.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

The following detailed description and the attached figures illustrate example embodiments. The reader will understand that other embodiments exist and are within the scope of the attached claims. In the attached figures, stacked blocks represent one or more similar, but not necessarily identical, items. In addition, ellipses between items represent one or more similar, by not necessarily identical, items. Items having the same reference numbers with different alphabetical suffixes (e.g., "A" through "N") are not intended to indicate the existence of a specific number of items.

Figure 1:
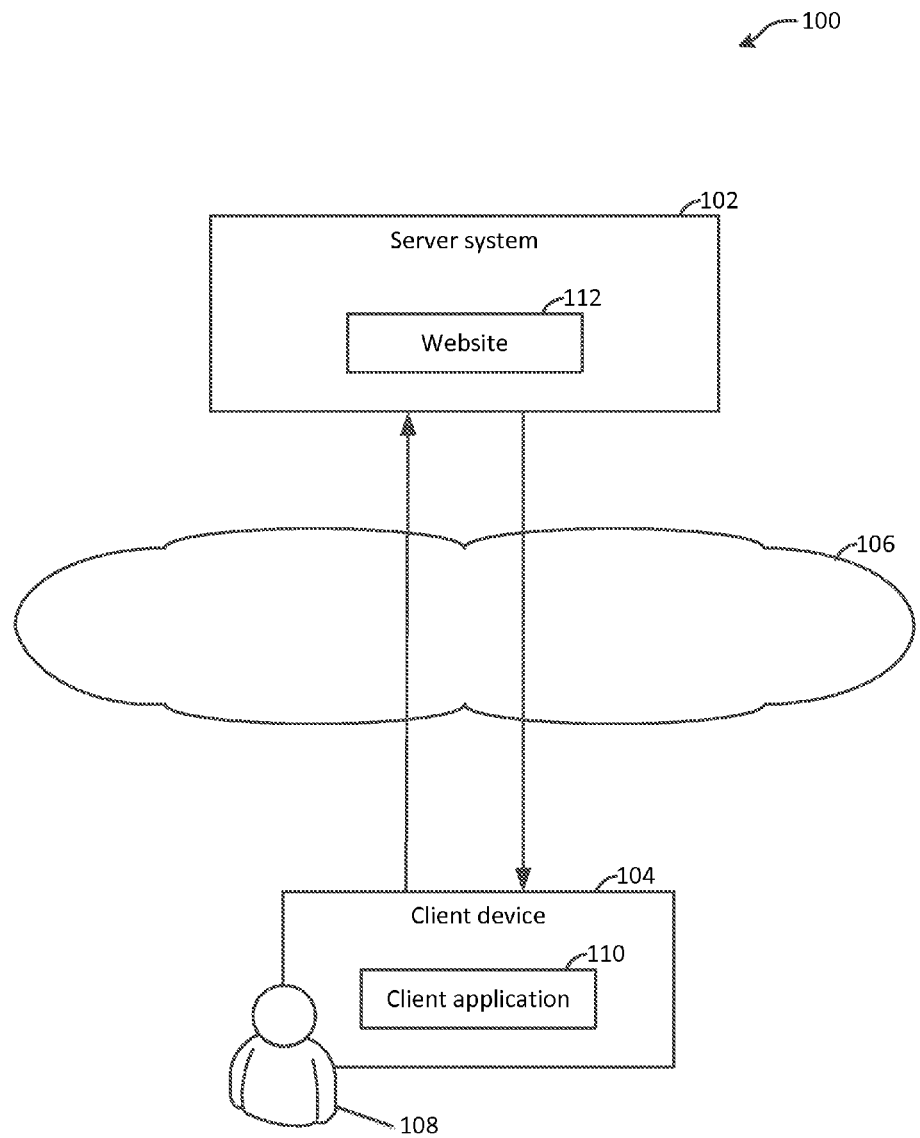
FIG. 1 is a block diagram illustrating an example system.

FIG. 1 is a block diagram illustrating an example system 100. As illustrated in the example of FIG. 1, the system 100 comprises a server system 102, a client device 104, and a network 106. In other embodiments, the system 100 can include more or fewer components. For example, some embodiments of the system 100 include client devices in addition to the client device 104.

The server system 102 and the client device 104 each comprise one or more computing devices. A computing device is a physical device for processing information. In various embodiments, the server system 102 and the client device 104 comprise various types of computing devices. For example, the server system 102 and/or the client device 104 can comprise one or more personal computers, standalone server devices, laptop computers, blade server devices, smart phones, tablet computers, network-enabled televisions or television set top boxes, game consoles, telephones, in-car computers, appliances, intermediate network devices, and/or other types of computing devices.

The network 106 facilitates communication between the client device 104 and the server system 102. In the example of FIG. 1, the network 106 is represented as a cloud. However, the network 106 can comprise various numbers of computing devices and links between the computing devices. In various embodiments, the network 106 can be structured in various ways. For example, the network 106 can be the Internet, an intranet, a local area network, a metropolitan area network, a wide area network, or another type of network. In some instances, some links within the network 106 are wireless and other links within the network 106 are wired.

A user 108 uses the client device 104. The user 108 can be various types of people. For example, the user 108 can be an employee of a company or a partner of that company. In another example, the user 108 can be a member of the general public.

The client device 104 provides a client application 110. In various embodiments, the client application 110 comprises various types of applications. For example, the client application 110 can be a web browser application, such as INTERNET EXPLORER® from Microsoft Corp., FIREFOX® from the Mozilla Foundation, or CHROME® from Google, Inc. In another example, the client application 110 can be a productivity application, such as a word processor application, a spreadsheet application, a slide presentation application, and so on.

The server system 102 hosts at least one website 112. In other words, the server system 102 provides functionality that enables clients to access resources in the website 112. The website 112 comprises a plurality of resources that can be accessed through a network, such as the network 106. For example, the website 112 can comprise webpages, word processor documents, PDF documents, spreadsheet documents, presentation documents, data sources, and other types of resources.

In various embodiments, the website 112 can be various types of website. For example, the website 112 can be a public Internet website for a company. In another example, the website 112 can be a private internal intranet website for a company. In yet another example, the website 112 can be a private collaboration website accessible by employees of multiple companies.

The client application 110 sends resource requests to the server system 102. The resources requests comprise requests to access resources in the website 112. In response to the resource requests, the server system 102 sends resource data to the client device 104. The client application 110 processes the resource data to present the resources to the user 108.

As described in detail elsewhere in this document, when the client application 110 sends a request for some resources in the website 112, the client application 110 receives a dataset and a set of template modules. The dataset comprises a set of objects. Each of the objects belongs to a content resource object type. For example, the dataset can include an object that belongs to a "phone number" content resource object type and an object that belongs to a "street address" content resource object type. Multiple elements in the dataset can have the same element type.

The template modules correspond to different content resource object types. For example, the dataset can include a content resource object that belongs to a "phone number" content resource object type and a content resource object that belongs to a "street address" content resource object type. In this example, the set of template modules includes a template module that corresponds to the "phone number" content resource object type and a template module that corresponds to the "street address" content resource object type.

The template modules specify conversion operations. A template module's template execution conversion operation, herein referred to as a template execution operation, transforms a conversion script which may be a collection of template modules into a presentation string when given an object belonging to the content resource object type corresponding to the template module. The presentation string is a character string that the client application 110 can render to create one or more onscreen features.

In various embodiments, presentation strings can conform to various presentation languages. For example, in some embodiments, the presentation strings conform to the Hypertext Markup Language (HTML). In other example, the presentation strings conform to a non-standardized language.

The client application 110 performs the template execution operations specified by the corresponding template modules on the content resource objects in the dataset. For example, the dataset can include an object that belongs to a "phone number" content resource object type. In this example, a given template module corresponds to the "phone number" content resource object type. In this example, the client application 110 generates a presentation string for the object by performing the template execution operation specified by the given template module. In this way, the client application 110 generates presentation strings needed to render a resource.

Figure 2:
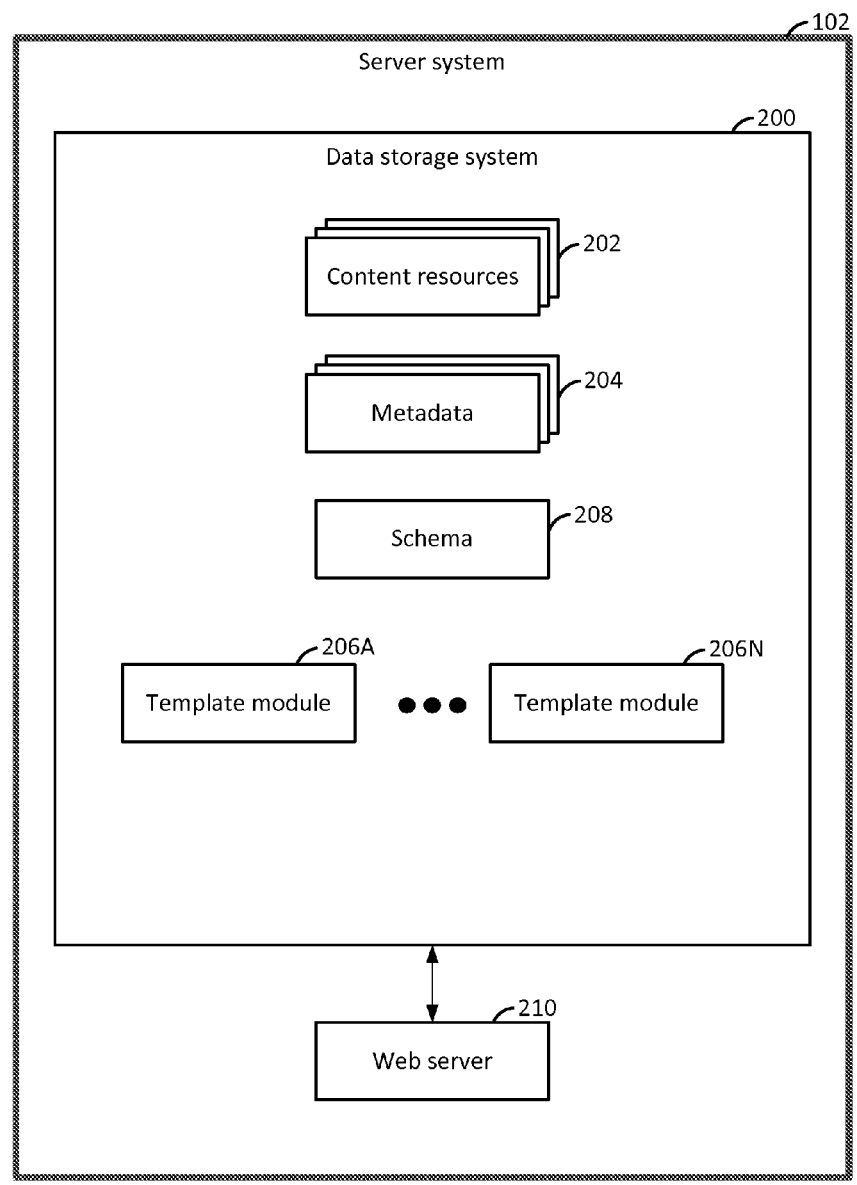
FIG. 2 is a block diagram illustrating example details of a server system.

FIG. 2 is a block diagram illustrating example components of the server system 102. As illustrated in the example of FIG. 2, the server system 102 comprises a data storage system 200. The data storage system 200 comprises one or more computer storage media. The term "computer storage media" encompasses devices or articles of manufacture that store computer-readable data or instructions. In some embodiments, the computer storage media in the data storage system 200 are geographically dispersed. In other embodiments, the computer storage media in the data storage system 200 are located within a single device or data center.

The data storage system 200 stores data for subsequent retrieval. The data storage system 200 stores content resources 202, metadata 204, a schema 208, and template modules 206A-206N (collectively, "template modules 206"). The content resources 202 can include some or all of the resources of the website 112. For example, the content resources 202 can include web page documents, word processor documents, PDF documents, digital images, video, spreadsheet documents, and so on.

The metadata 204 comprises data regarding the content resources 202. For example, the content resources 202 can include a word processor document. In this example, the metadata 204 can include data indicating an author, a creation time, a modified time, a title, and a summary of the word processor document.

Each of the template modules 206 comprises a set of software instructions that specifies a template execution operation. The template execution operations take objects in datasets and generate corresponding presentation strings. In various embodiments, the software instructions can conform to various programming languages. For example, the software instructions in one or more of the template modules 206 can conform to the JavaScript programming language. In other words, one or more of the template modules 206 can specify the template execution operations as sets of JavaScript instructions. In another example, the software instructions in the template modules 206 can conform to the Perl programming language.

Some embodiments store the template modules 206 in template module files. In some such embodiments, the template module files have file name extensions that correspond to the programming language used in the template modules 206. For example, if one of the template modules 206 contains software instructions conforming to the JavaScript programming language, the template module file containing the template module can have the file name extension ".js".

The schema 208 specifies allowable content resource types in datasets sent by the server system 102 to the client device 104. In various embodiments, the schema 208 specifies that various content resource types are allowable in the datasets. For example, the schema 208 can specify that datasets must include a collection of content resource objects belonging to a certain content resource type. In this example, the schema 208 can specify that the collection of content resource objects includes one or more objects belonging to a "person" content resource type. In this example, the schema 208 can further specify that content resource objects belonging to the "person" content resource type include a "name" content resource object or data element, which is of a string content resource object type or data element type, a "phone number" content resource object or data element belonging to a "phone number" content resource object type or data element type, and a "street address" content resource object or data element belonging to a "location address" content resource object type or data element type. The term "content resource object" will herein be used to describe a data element (e.g., name, phone number, street address, etc.) of a specified content resource type (e.g., "person" content resource type) in a dataset. The term "content resource object type" will herein be used to describe a type of a content resource object (e.g., a string, a phone number, a location address, etc.).

Furthermore, the schema 208 maps content resource object types to the template modules 206. Continuing the example of the previous paragraph, the schema 208 can map the top-level collection in the dataset to the template module 206A, map the "person" content resource type to the template module 206B, map the "location address" content resource object type to the template module 206N, and so on.

In various embodiments, the schema 208 is formatted in various ways. For example, in some embodiments, the datasets sent by the server system 102 are formatted as XML. In this example, the schema 208 can be formatted in Document Type Definition (DTD) language, the XML Schema language, the RELAX NG language, or another schema language for XML. In other embodiments, the datasets are not formatted as XML and the schema 208 is formatted using other schema definition languages.

In addition to the data storage system 200, the server system 102 provides a web server 210. Some embodiments of the server system 102 provide the web server 210 by executing instructions stored on one or more computer storage media. The web server 210 is configured to provide resources hosted by the server system 102 to the client application 110 in response to resource requests. For example, the web server 210 can provide the content resources 202, data sets, the template modules 206, the schema 208, and other resources in response to resource requests.

Figure 3:
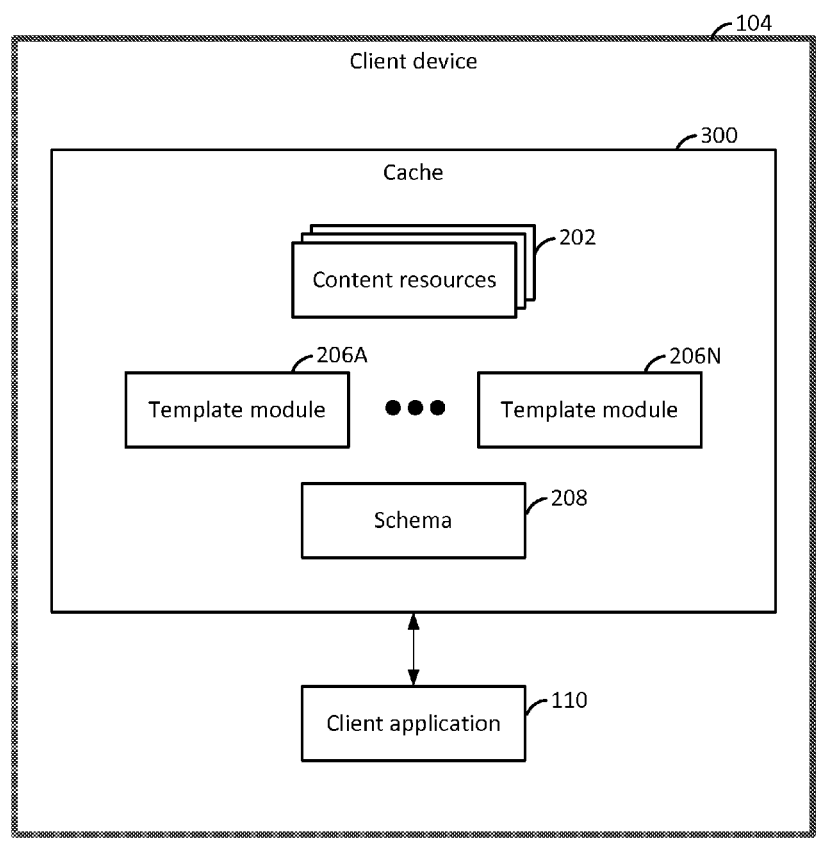
FIG. 3 is a block diagram illustrating example details of a client device.

FIG. 3 is a block diagram illustrating example details of the client device 104. As illustrated in the example of FIG. 3, the client device 104 comprises a cache 300 and the client application 110.

When the client application 110 receives content resources 202, the template modules 206, or the schema 208, the client application 110 stores copies of the content resources 202, the template modules 206, and the schema 208 in the cache 300.

Various embodiments implement the cache 300 in various ways. For example, some embodiments implement the cache 300 as a folder or directory in a file system. Other example embodiments implement the cache 300 as a relational database.

Figure 4:
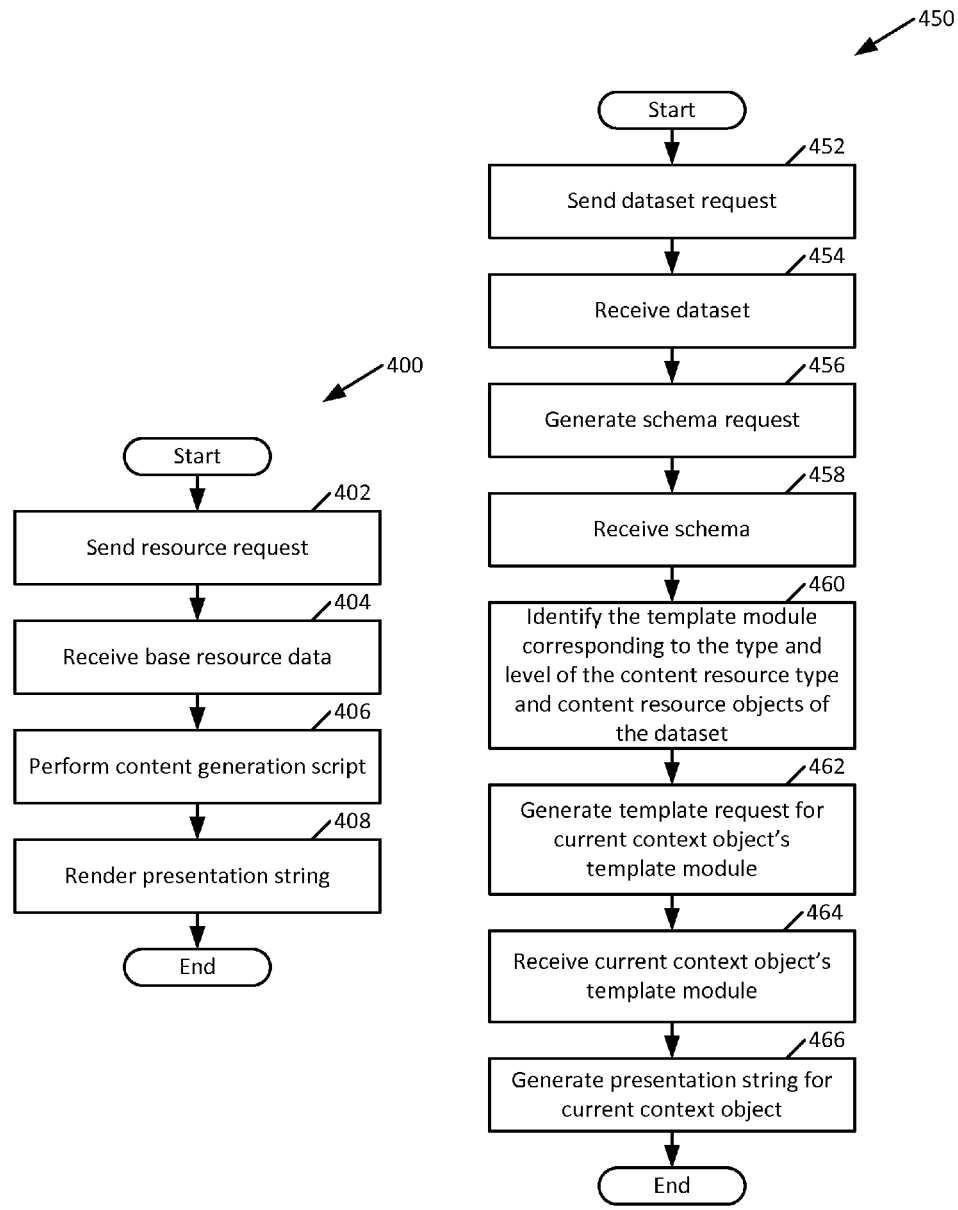
FIG. 4 is illustrates a flowchart for an example operation of the client application and a flowchart for an operation performed when a content generation script is performed.

FIG. 4 is illustrates a flowchart for an example operation 400 of the client application 110 and a flowchart for an operation 450 performed when a content generation script is performed. Various embodiments of the client application 110 can perform the operation 400 in response to various events. For example, the client application 110 can perform the operation 400 when the user 108 enters a URL in an address bar of the client application 110. In another example, the client application 110 can perform the operation 400 when the user 108 selects a link in another webpage.

After the operation 400 starts, the client application 110 sends a resource request to the web server 210 (402). The resource request requests a user interface, such as a webpage in the website 112. In various embodiments, the resource request conforms to various protocols. For example, in some embodiments, the resource request conforms to the Hypertext Transfer Protocol (HTTP). In other example embodiments, the resource request conforms to another protocol, such as SOAP.

The client application 110 receives base resource data from the web server 210 in response to the resource request (404). The base resource data includes a content generation script. When the client application 110 performs the content generation script, the content generation script inserts content into the user interface.

In various embodiments, the base resource data comprises various data in addition to the content generation script. For example, the base resource data can comprise HTML data, additional scripts, and so on.

After the client application 110 receives the base resource data, the client application 110 performs the content generation script in the base resource data (406). Performance of the content generation script causes the client application 110 to generate a presentation string. After the client application 110 generates the presentation string, the client application 110 renders the presentation string (408). Rendering the presentation string comprises rendering presentation strings within the presentation string. When the client application 110 renders presentation strings, the client application presents sets of on-screen features to the user 108.

In some embodiments, performance of the content generation script causes the client application 110 to perform the operation 450. After the operation 450 starts, the client application 110 sends a dataset request (452). The dataset request comprises a request for a dataset. In response, the web server 210 generates the dataset and sends the dataset to the client application 110. Subsequently, the client application 110 receives the dataset (454). In other words, the client application 110 downloads the dataset.

In various embodiments, the web server 210 generates the dataset in various ways. For example, the web server 210 can use the content resources 202 and/or the metadata 204 to generate the dataset. In this example, the content resources 202 can include entries in a company's employee directory. In this example, the resource request can comprise a search query for employees having the last name "Jones." In this example, the web server 210 obtains a list of search results. The search results are ones of the content resources 202 that satisfy the search query. In this example, the web server 210 generates a dataset that contains data regarding the search results. For instance, in this example, the web server 210 can generate the following dataset:

```
Search_Results {
    Person {
        Name::Steven Jones;
        Email_addr::sjones@contoso.com;
    }
    Person {
        Name::Jane Jones;
        Email_addr:jjones@contoso.com
    }
}
```

As mentioned above, the dataset comprises one or more collections of content resource types containing content resource objects. In some instances, other collections of content resource types are nested in the content resource objects of the content resource types in the top level dataset. In other words, the content resource objects in the collections of the top level dataset can contain child objects of simple or complex content resource object types. In the example dataset shown above, the "Search_Results" object is a data collection in the top level dataset. The two "Person" content resource types are contained in the "Search_Results" collection. The "Name" content resource object and the "Email_addr" content resource object are content resource objects of the "Person" content resource type.

In other embodiments, the client application 110 does not generate the dataset request. In such embodiments, the base resource data can include the dataset.

In addition, the client application 110 generates a schema request (456). The schema request comprises a request for the schema 208. In other embodiments, the client application 110 does not generate schema requests. In such embodiments, the base resource data includes the schema 208.

When the client application 110 generates the schema request, the client device 104 determines whether the cache 300 includes a copy of the schema 208. If the cache 300 does not include a copy of the schema 208, the client device 104 forwards the schema request to the web server 210. The web server 210 returns the schema 208 to the client device 104 in response to the schema request. In other words, the client device 104 downloads the schema 208. The client device 104 then provides the schema 208 to the client application 110. On the other hand, if the cache 300 stores a copy of the schema 208, the client device 104 provides the copy of the schema 208 to the client application 110. In either case, the client application 110 receives the schema 208 (458).

After the client application 110 receives the dataset and the schema 208, the client application 110 uses the schema 208 to identify a template module that corresponds to the type and a level of the content resource types and content resource objects of the dataset (460). As mentioned above, the schema 208 maps resource, level and content resource object types to the template modules 206. The client application 110 uses the schema 208 to identify the template module that corresponds to the type and level of the content resource types and content resource objects by determining, due to the schema 208 mapping a given template module to a content resource type or level or content resource object type, that the given template module corresponds to a current template execution operation on the dataset. For ease of explanation, this document can refer to a current content resource object or data element at a current level as a current context object, and the template module that corresponds to the current context object as that object's template module.

After identifying the current context object's template module, the client application 110 generates a template request (462). The template request comprises a request for the current context object's template module. When the client application 110 generates the template request, the client device 104 determines whether the cache 300 stores the current context object's template module. If the cache 300 does not store the current context object's template module, the client device 104 does not forward the template request to the web server 210. Rather, the client device 104 provides the cached copy of the current context object's template module to the client application 110 in response to the template request. Otherwise, if the cache 300 does not store the current context object's template module, the client device 104 sends the template request to the web server 210. Subsequently, the client device 104 receives the current context object's template module from the web server 210. In other words, the client device 104 downloads the current context object's template module. In either case, the client application 110 receives the current context object's template module in response to the template request (464).

After the client application 110 receives the current context object's template module, the client application 110 generates a presentation string for the current context object (466). The client application 110 generates the presentation string for the current context object by performing the template execution operation of the current context object's template module on the current context object. As mentioned above, the presentation string can comprise HTML data. In some instances, the presentation string can also comprise one or more scripts.

The client application 110 can perform the operation 400. Between times that the client application 110 performs the operation 400, the schema 208 can change. For example, an administrator can change the schema 208 to change the allowable content resource object types in datasets generated by the server system 102. Consequently, in this example, when the client application 110 performs the operation 400 again, the client application 110 can download a dataset that includes one or more objects belonging to content resource object types that were not previously allowable. Because the template modules 206 are separate from the schema, a developer may only need to update the template modules corresponding to the changed object types and not other ones of the template modules 206.

In another example, an administrator can change the schema 208 to change the mappings between object types and template modules. Consequently, in this example, when the client application 110 performs the operation 400 again, the client application 110 can download a second dataset that includes content resource objects or data elements belonging to a given type. Whereas when the client application 110 previously performed a template execution operation of a given template module on objects of the given type at a given level, the client application 110 now generates presentation strings for objects of the given type by performing a template execution operation of a different template module on the objects of the given content resource object type. The client application 110 can then render these presentation strings. In some instances, it may not be necessary for a programmer to rewrite the code of any of the template modules 206 in response to such a change to the schema 208.

Figure 5:
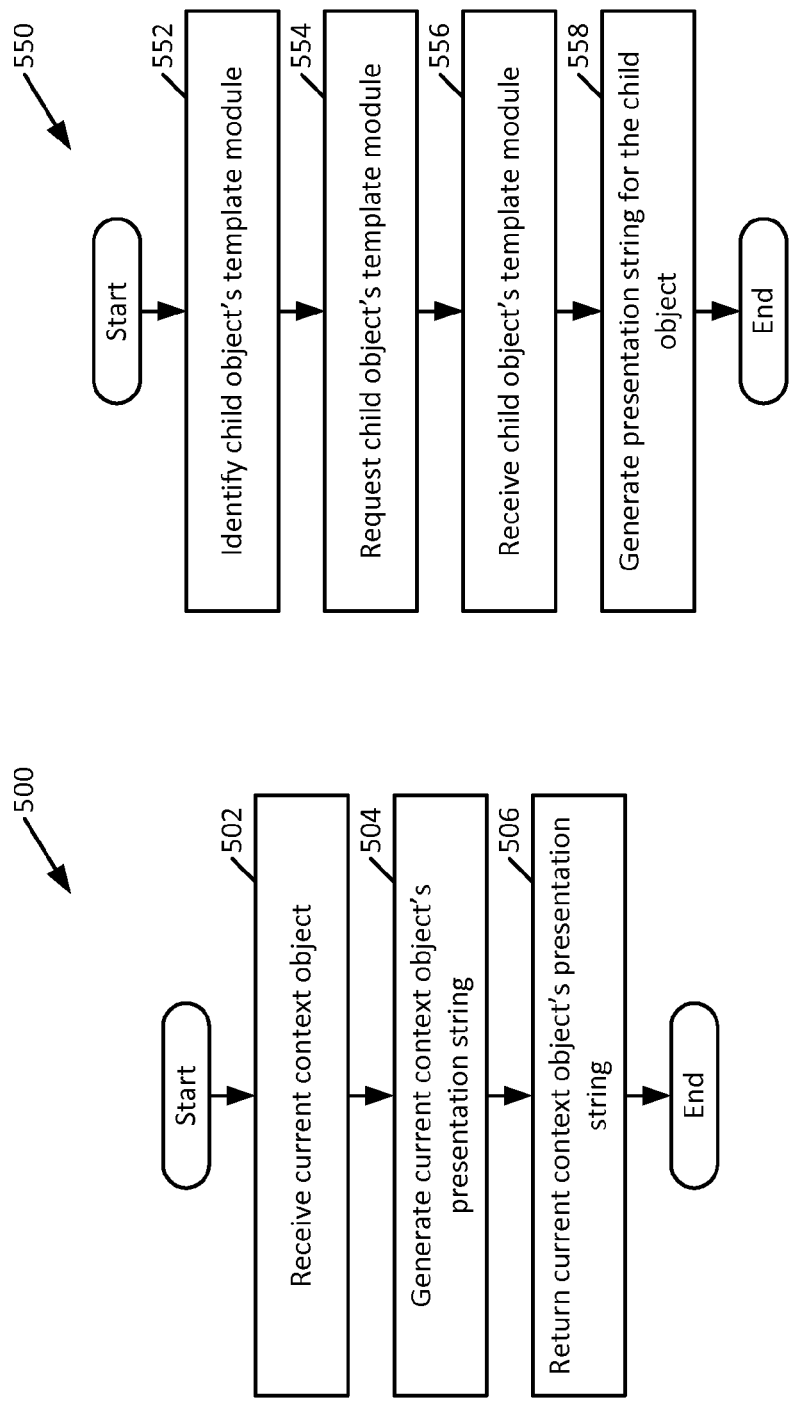
FIG. 5 illustrates a flowchart for an example template execution operation and a flowchart for an example operation to generate a presentation string for a child context object.

FIG. 5 illustrates a flowchart for an example template execution operation 500 and a flowchart for an example operation 550 to generate a presentation string for a child object. For ease of explanation, this document explains the template execution operation 500 and the operation 550 with reference to the template module 206A. In some embodiments, the template execution operations of each of the template modules 206 are similar to the template execution operation 500.

The template execution operation 500 starts when the client application 110 or the template execution operation of another template module invokes the template execution operation 500 of the template module 206A. For example, if the template module 206A corresponds to a root level presentation of relevant types of content resources in the dataset, the client application 110 invokes the template execution operation 500. However, if the template module 206A corresponds to some other level or object type in the dataset, the template execution operation of another template module invokes the template execution operation 500.

When the template execution operation 500 is invoked, the template module 206A receives a current context object in the dataset (502). In various embodiments, the template module 206A receives the current context object in various ways. For example, some embodiments of the template execution operation 500 receive the current context object as a parameter.

After receiving the current context object, the template module 206A generates the current context object's presentation string (504). In instances where the current object has one or more child objects, the current object's presentation string can include the child object's presentation strings.

When the template module 206A generates the current context object's presentation string, the template module 206A can include one or more pre-determined strings into the current cxt object's presentation string. For example, the template module 206A can include a string that comprises a series of tags into the current context object's presentation string. This series of tags can define a layout or formatting.

Furthermore, as part of generating the current context object's presentation string, the template module 206A can perform the operation 550 one or more times to generate the child objects' presentation strings. After the operation 550 starts, the template module 206A uses the schema 208 to identify a template module that corresponds to a given child object of the current context object (552). For instance, the template module 206A can determine, based on the schema 208 mapping a content resource object type of the given child object to the template module, that the template module corresponds to the given object. For ease of explanation, this document can refer to the template module corresponding to the given child object as the given child object's template module.

After identifying the given child object's template module, the template module 206A requests the given child object's template module (554). If the cache 300 stores a given child object's template module, the template module 206A retrieves the given child object's template module from the cache 300 without sending a request for the given child object's template module to the web server 210. On the other hand, if the cache 300 does not store the given child object's template module, the template execution operation 500 sends a request to the web server 210 for the given child object's template module. In either case, the client application 110 subsequently receives the given child object's template module (556). In other words, the client application 110 downloads the given child object's template module.

After receiving the given child object's template module, the template module 206A generates a presentation string for the given child object (558). The template module 206A generates the presentation string for the given child object by invoking the template execution operation of the given child object's template module on the given child object.

For example, the following string can represent the current context object:

```
Person {
    Name::Steven Jones;
    Email_addr:sjones@contoso.com
}
```

In this example, the current context object is of a "person" content resource type, a first child object is of the "Name" content resource object type, and a second child object is of the "Email_addr" content resource object type. In this example, the template module 206A generates a presentation string for the first child object by performing the template execution operation of the template module corresponding to the "Name" content resource object type. For example, the template module 206A can generate the following presentation string for the first child object:

Name: <b> STEVEN JONES </b>

In this example, the template module 206A generates a presentation string for the second child object by performing the template execution operation of the template module corresponding to the "Email_addr" content resource type. For example, the template module 206A can generate the following presentation string for the second child object:

<i> Email address: </i><a href="mailto:sjones@contoso.com">sjones@contoso.com</a>

Continuing the example from the previous paragraph, the template module 206A can generate the following presentation string for the current context object:

```
<table>
    <tr>
        <td> Name: <b> STEVEN JONES </b> </td>
        <td> <i> Email address: </i>
            <a href="mailto:sjones@contoso.com">
            sjones@contoso.com</a>
        </td>
    </tr>
</table>
```

The reader will notice that the current cxt object's presentation string includes the child objects' presentation strings as shown above. In some embodiments, the template module 206A can modify one or more of the child objects' presentation strings.

After generating the presentation string for the current context object, the template module 206A returns the current context object's presentation string to an operation that invoked the template execution operation 500 (506). For example, if the client application 110 invoked the template execution operation 500, the template module 206A returns the current context object's presentation string to the client application 110. If another template module's template execution operation invoked the template execution operation 500, the template execution operation 500 returns the current context object's presentation string to the other template module's template execution operation.

Figure 6:
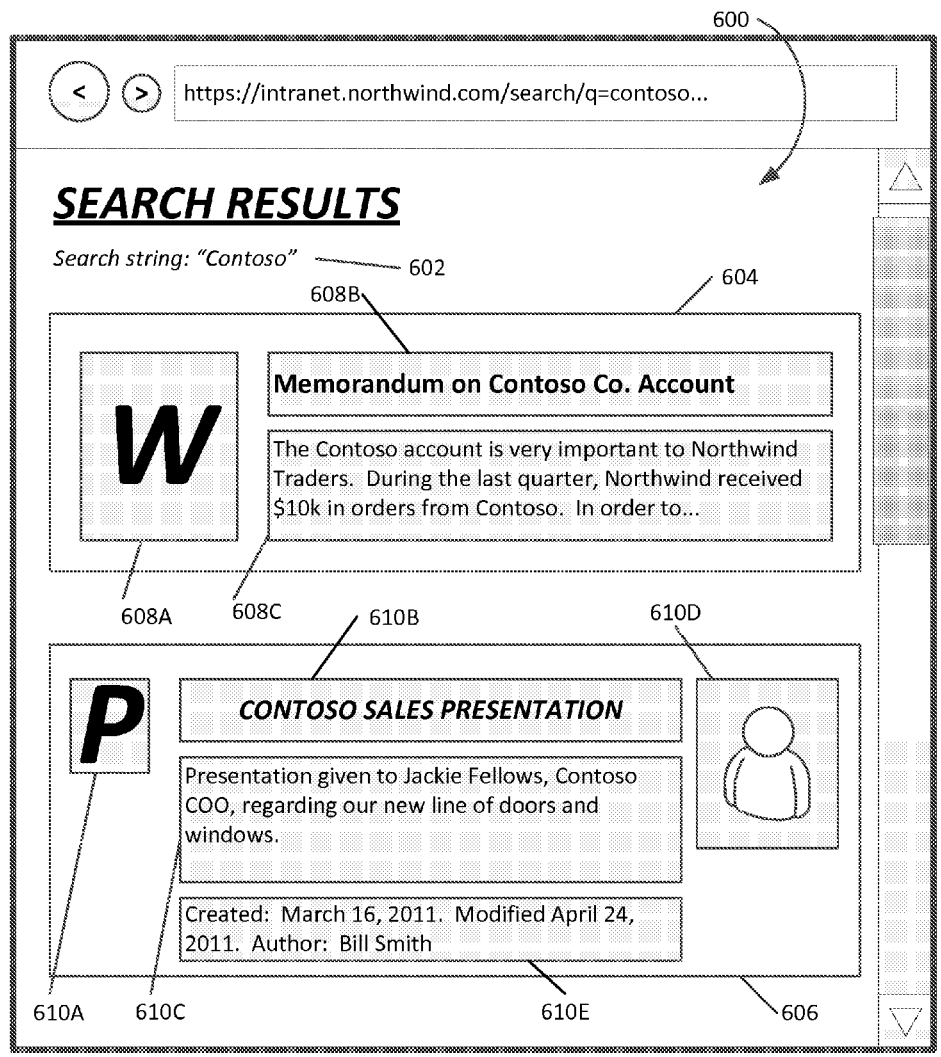
FIG. 6 is a screen illustration of an example search results interface.

FIG. 6 is a screen illustration of an example search results interface 600. The client application 110 can present the search results interface 600 to the user 108 when the user 108 inputs a search string into a user interface presented by the client application 110. In the example of FIG. 6, the search results interface 600 includes a search string field 602, a filled template 604, and a filled template 606. The filled template 604 is a set of on-screen features describing a resource that satisfies the search string. The filled template 606 is another set of on-screen features describing another resource that satisfies the search string. The filled template 604 includes fields 608A through 608C (collectively, "fields 608"). The filled template 606 includes fields 610A through 610E (collectively, "fields 610").

In the example of FIG. 6, the client application 110 can receive the following dataset after sending the search string to the server system 102:

```
Search_Results {
    Search_string::Contoso;
    Word_processor_search_result {
        type_image::imgs/w.jpg;
        title::Memorandum on Contoso Co. Account;
        snippet::The Contoso account is very
        important to Northwind Traders.
        During the last quarter, Northwind received
        $10k in orders from Contoso. In
        order to . . . ;
    }
    Presentation_search_result {
        type_image::imgs/p.jpg;
        title::Contoso Sales Presentation;
        summary::Presentation given to Jackie Fellows,
        Contoso COO, regarding our
        new line of doors and windows.
        created::03/16/2011;
        modified::04/24/2011;
        author::Bill Smith;
        author_img::imgs/billsmith.jpg;
    }
}
```

Readers will understand that this dataset is for purposes of explanation only. In other embodiments, datasets have other formats and content.

After the client application 110 receives this dataset, the client application 110 generates the presentation string representing the search results interface 600. The client application 110 generates the presentation string representing the search results interface 600 by performing a template execution operation of a template module that corresponds to the "Search_Results" content resource type.

To generate the presentation string representing the search results interface 600, the client application 110 generates a presentation string representing the search string field 602 by performing a template execution operation of a template module that corresponds to the "Search_string" content resource type. In addition, the client application 110 generates a presentation string representing the filled template 604 by performing a template execution operation of a template module that corresponds to the "Word_processor_search_result" content resource type. In this way, the filled template 604 is based on the template module that corresponds to the "Word_processor_search_result" content resource type. As part of generating the presentation string representing the filled template 604, the client application 110 generates presentation strings representing the fields 608 by performing template execution operations of template modules that correspond to the "type_image," the "title," and the "snippet" content resource types.

The client application 110 generates a presentation string representing the filled template 606 by performing a template execution operation of a template module that corresponds to the "Presentation_search_result" content resource type. In this way, the filled template 606 is based on the template module that corresponds to the "Presentation_search_result" content resource type. As part of generating the presentation string representing the filled template 606, the client application 110 generates presentation strings representing the fields 610 by performing template execution operations of the template modules that correspond to the "type_image," "title," "summary," "created," "modified," "author," and "author_img" content resource types.

Figure 7:
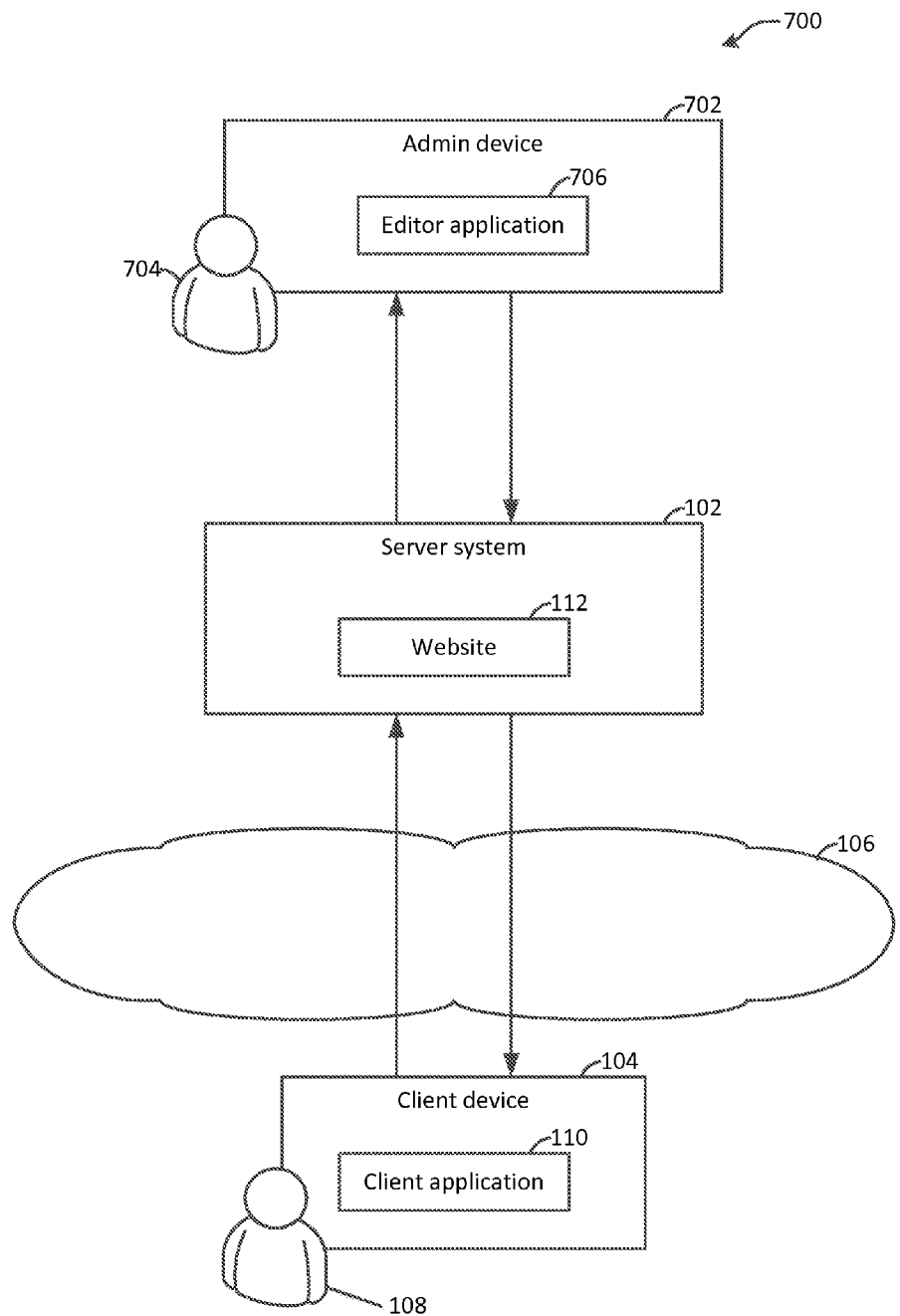
FIG. 7 is a block diagram illustrating an alternate example system.

FIG. 7 is a block diagram illustrating an alternate example system 700. As illustrated in the example of FIG. 7, the system 700 comprises the server system 102, the client device 104, the network 106, and the user 108. As in the system 100, the server system 102 hosts the website 112 and the client device 104 provides the client application 110. However, the system 700 also includes an admin device 702 and an admin 704. In other embodiments, the system 700 can include more or fewer components. For example, some embodiments of the system 700 include client devices in addition to the client device 104.

The admin device 702 comprises one or more computing devices. In various embodiments, the admin device 702 can comprise various types of computing devices. For example, the admin device 702 can comprise one or more personal computers, standalone server devices, laptop computers, blade server devices, smart phones, tablet computers, network-enabled televisions or television set top boxes, game consoles, telephones, in-car computers, appliances, intermediate network devices, and/or other types of computing devices. The admin device 702 is able to communicate with the server system 102 using the network 106 or another network.

The admin 704 uses the admin device 702. The admin 704 is a person responsible for performing administrative tasks on the website 112. For example, the admin 704 can be responsible for creating, configuring, and deleting resources in the website 112. The admin 704 can be various types of people. For example, the admin 704 can be an employee or contractor of a company associated with the website 112 or an employee of another company.

Among other the administrative tasks that the admin 704 performs on the website 112, the admin 704 manages the template modules 206 of the website 112. For example, the admin 704 can develop or modify the template modules 206 of the website 112. As described in detail elsewhere in this document, the admin 704 can edit the template modules 206 by modifying generic presentation strings for the template modules 206.

The generic presentation string of a given template module is a presentation string is renderable to present an unfilled template. In various embodiments, the presentation string conforms to various presentation languages. For example, the generic presentation string can conform to HTML.

The unfilled template includes one or more slots. The slots indicate locations into which data based on content resource objects in a dataset can be filled. Presentation strings generated by performing the template execution operation of the given template module on content resource objects belonging to a given content resource type are renderable by the client application 110 to present filled versions of the given template. The filled templates are on-screen features displayed to the user 108. In the filled templates, data based on the objects belonging to the given content resource object type replace the slots in the unfilled template. In other words, the slots in the unfilled template are replaced by data based on the objects. A filled template is based on a template module where the filled template rendering is a presentation string generated by the template execution operation of the template module.

Furthermore, in some embodiments, the admin device 702 provides an editor application 706. The editor application 706 enables users to edit the generic presentation strings for the template modules 206 by editing the generic on-screen features of the template modules 206. Because the editor application 706 enables users to edit the generic on-screen features instead of the underlying presentation strings or the template modules 206, the editor application 706 may be characterized as a What-You-See-Is-What-You-Get (WYSIWYG) editor application. Example WYSIWYG editor applications include VISUAL STUDIO® from Microsoft Corp., EXPRESSION® from Microsoft Corp., DREAMWEAVER® from Adobe Systems, and so on. As described elsewhere in this document, the admin 704 can use the editor application 706 to edit the template modules 206.

Figure 8:
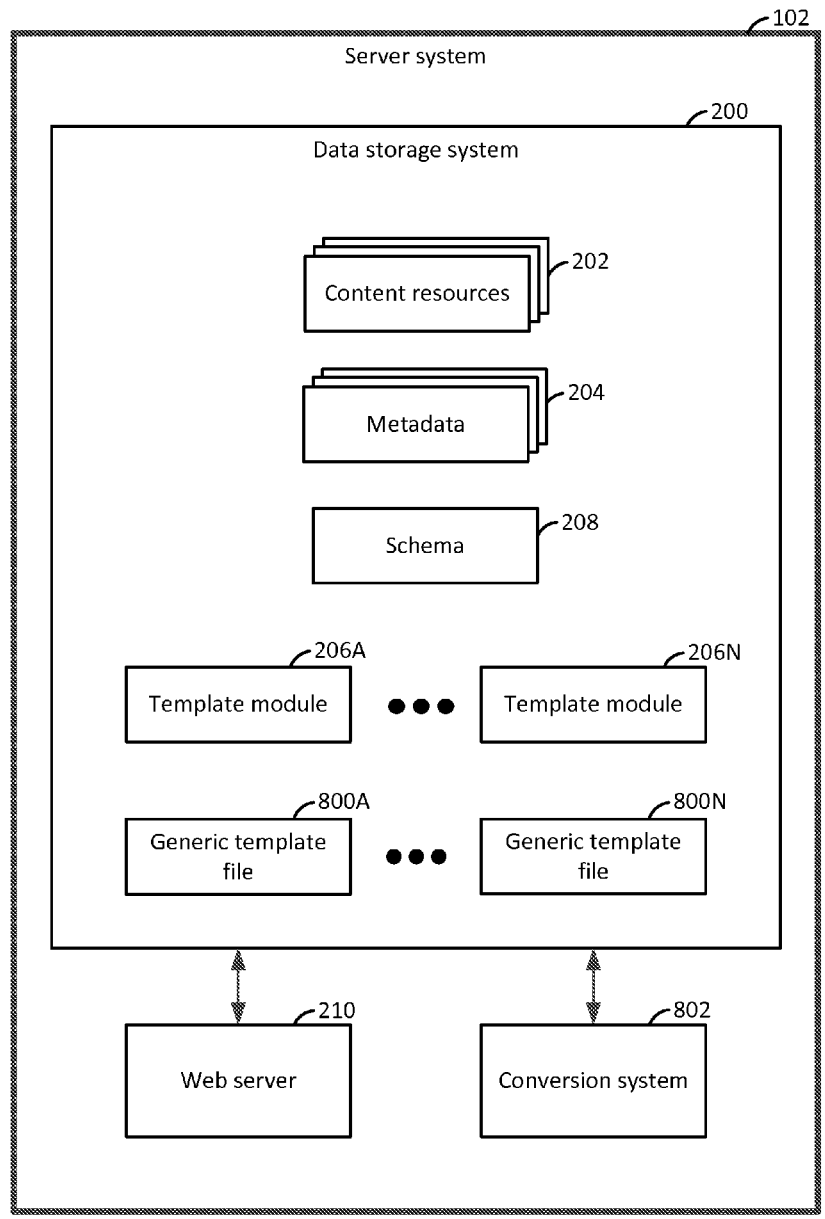
FIG. 8 is a block diagram illustrating example components of the alternate embodiment of the server system.

FIG. 8 is a block diagram illustrating example components of an alternate embodiment of the server system 102. As illustrated in the example of FIG. 8, the server system 102 comprises the data storage system 200. As in the example of FIG. 2, the data storage system 200 stores the content resources 202, the metadata 204, the schema 208, and the template modules 206.

In addition, the data storage system 200 stores generic template files 800A through 800N (collectively, "generic template files 800"). Each of the generic template files 800 corresponds to a different one of the template modules 206. Each of the generic template files 800 stores the generic presentation string for the corresponding template module. For example, the generic template file 800A can store the generic presentation string for the template module 206A and the generic template file 800N can store the generic presentation string for the template module 206N.

In some embodiments, the generic template files 800 have file name extensions that correspond to formats of the generic presentation strings in the files. For example, if the generic presentation strings in the generic template files 800 are formatted as HTML data, the generic template files 800 can have the file name extensions ".html" or ".htm".

As illustrated in the example of FIG. 8, the server system 102 provides the web server 210. In addition, the server system 102 provides a conversion system 802. The server system 102 can provide the conversion system 802 by reading computer-executable instructions from one or more computer readable media and executing the computer-executable instructions. As described in detail elsewhere in this document, the conversion system 802 uses the generic presentation strings in the generic template files 800 to generate the template modules 206.

Figure 9:
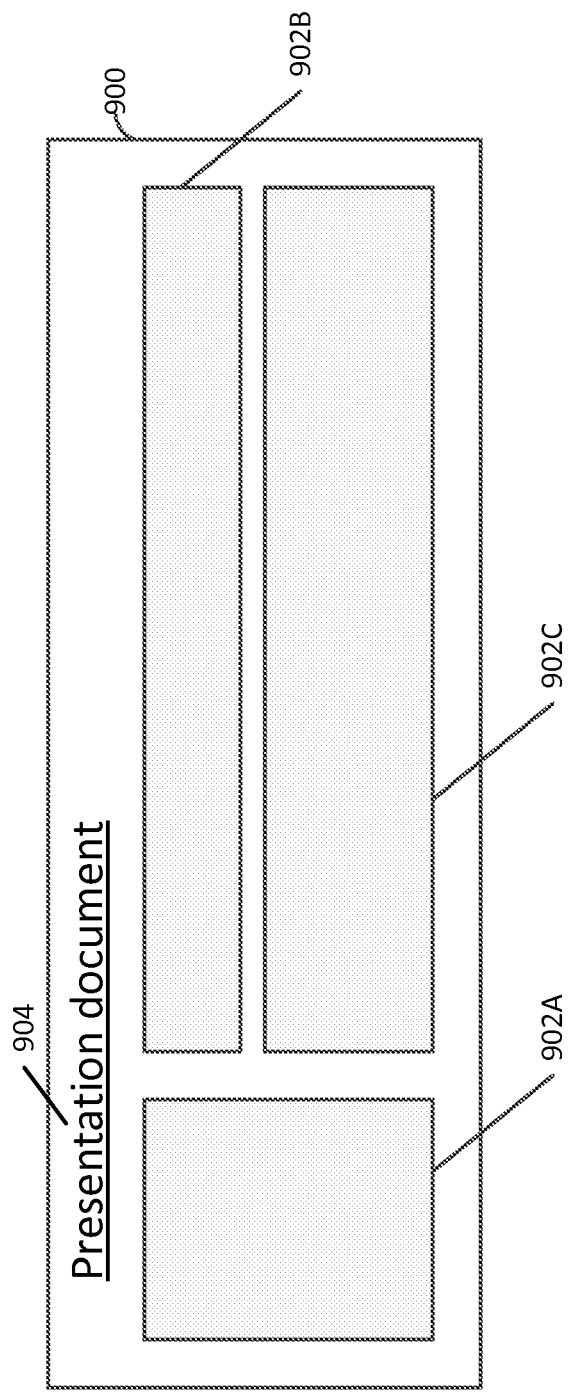
FIG. 9 is a block diagram illustrating an example unfilled template.

FIG. 9 is a block diagram illustrating an example unfilled template 900. For ease of explanation, this document describes FIG. 9 with reference to the generic template file 800A and the template module 206A. Readers will understand that the description of FIG. 9 may be applicable to other ones of the generic template files 800 and template modules 206.

The editor application 706 can generate the unfilled template 900 by rendering a generic presentation string in the generic template file 800A. In the example of FIG. 9, the unfilled template 900 comprises slots 902A-902C (collectively, "slots 902"). In filled templates corresponding to the unfilled template 900, the slots 902 are replaced by data based on objects in a dataset. The generic presentation string defines sizes and positions of the slots 902 in the unfilled template 900.

When the editor application 706 displays the unfilled template 900, the admin 704 can use surrounding static literal presentation string content to define the position and size of the slots 902 within the unfilled template 900. Furthermore, the admin 704 can add fields to or remove fields from the unfilled template 900 or add other static literal presentation string content or template module execution logic.

Each of the slots 902 is associated with a different object of the given type and level. For example, a content resource object belonging to the given type can include content resource objects such as "title", "type_image", "snippet," and "URL" each of which has a particular content resource object type. In this example, the admin 704 can interact with the editor application 706 to associate the slot 902A with the "type_image" content resource object, the slot 902B with the "title" content resource object, and slot 902C with the "snippet" content resource object.

After the admin 704 associates the slots 902 with child object types, the admin 704 can configure the slots 902. For example, the admin 704 can configure the slot 902C such that text in the slot 902C has a particular style, such as italic. In another example, the given content resource object type can include a child object belonging to a "URL" content resource object type. In this example, the admin 704 can use one or more graphical user interfaces to configure the slot 902A such that text within the slot 902A is a hyperlink to a URL specified by the child object belonging to the "URL" content resource object type.

Furthermore, the admin 704 can add fixed text 904 or other static features to the unfilled template 900. In the example of FIG. 9, the admin 704 has added the fixed text "Presentation Document" to the unfilled template 900. Consequently, when the client application 110 presents filled templates based on the template module 206A, the text "Presentation Document" appears as an on-screen object in the filled templates.

When the admin 704 edits the unfilled template 900, the editor application 706 updates the generic presentation string of the given template module to reflect the changes to the unfilled template 900. For example, the generic presentation string can include <div> tags for each of the slots 902. In this example, id attributes of the <div> tags indicate the child object types associated with the slots 902. In this example, when the admin 704 changes child object types associated with the slots 902, the editor application 706 change the values of the id attributes of the <div> tags to reflect the new child object types.

Figure 10:
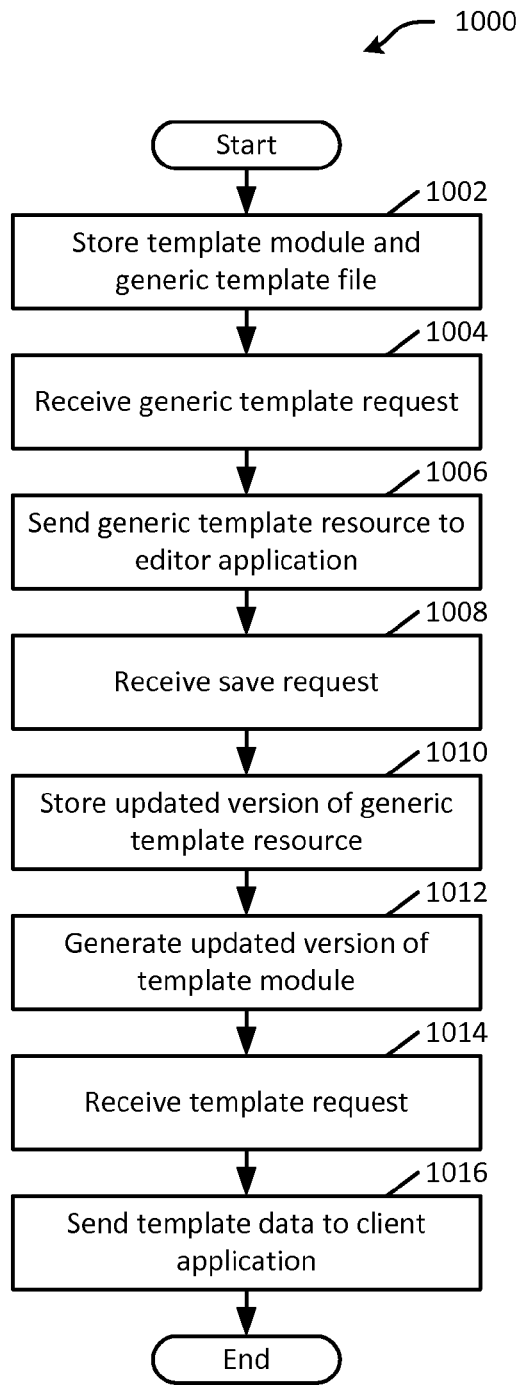
FIG. 10 is a flowchart illustrating an example operation of the server system.

FIG. 10 is a flowchart illustrating an example operation 1000 of the server system 102. The example of FIG. 10 is explained with reference to the template module 206A and the generic template file 800A. Readers will understand that the server system 102 can perform similar operations with regard to other ones of the template modules 206 and other ones of the generic template files 800.

After the operation 1000 begins, the server system 102 stores the template module 206A and the generic template file 800A in the data storage system 200 (1002). In various embodiments, the server system 102 performs various actions to store the template module 206A and the generic template file 800A in the data storage system 200. For example, some embodiments of the server system 102 receive the template module 206A without receiving the generic template file 800A. In this example, the server system 102 can generate the generic template file 800A from the template module 206A and store both the template module 206A and the generic template file 800A to the data storage system 200. In another example, some embodiments of the server system 102 receive the generic template file 800A without receiving the template module 206A. In this example, the conversion system 802 can generate the template module 206A from the generic template file 800A and store both the template module 206A and the generic template file 800A to the data storage system 200.

Next, the web server 210 receives a generic template request from the editor application 706 (1004). The generic template request comprises a request to retrieve the generic template file 800A. In response to the generic template request, the web server 210 sends the generic template file 800A to the editor application 706 (1006). After the editor application 706 receives the generic template file 800A, the editor application 706 can update the generic presentation string in the generic template file 800A, thereby creating an updated version of the generic template file 800A.

The updated version of the generic presentation string can differ from the earlier version of the presentation string in various ways. For example, the updated version of the generic presentation string can be renderable to present an updated version of the unfilled template. In this example, the slots of the updated version of the unfilled template may be different that the slots of the earlier version of the unfilled template. In another example, the updated version of the unfilled template may include different text or images than the earlier version of the unfilled template.

Subsequently, the web server 210 receives a save request from the editor application (1008). Upon receiving the save request, the web server 210 uses data in the save request to store the updated version of the generic template file 800A in the data storage system 200 (1010). In various embodiments, the save request comprises various data. For example, in some embodiments, the save request comprises a copy of the updated version of the generic template file 800A. In this example, the web server 210 copies the updated version of the generic template file 800A to the data storage system 200. In another example, the save request comprises data that indicate differences between the initial version of the generic template file 800A and the updated version of the generic template file 800A. In this example, the web server 210 uses the differences to recreate the updated version of the generic template file 800A. In this example, the web server 210 then stores the recreated updated version of the generic template file 800A in the data storage system 200.

After receiving the save request, the conversion system 802 uses the edited version of the generic template file 800A to generate an updated version of the template module 206A (1012). In some instances, the web server 210 replaces an earlier version of the template module 206A in the data storage system 200 with the updated version of the template module 206A.

Figure 11:
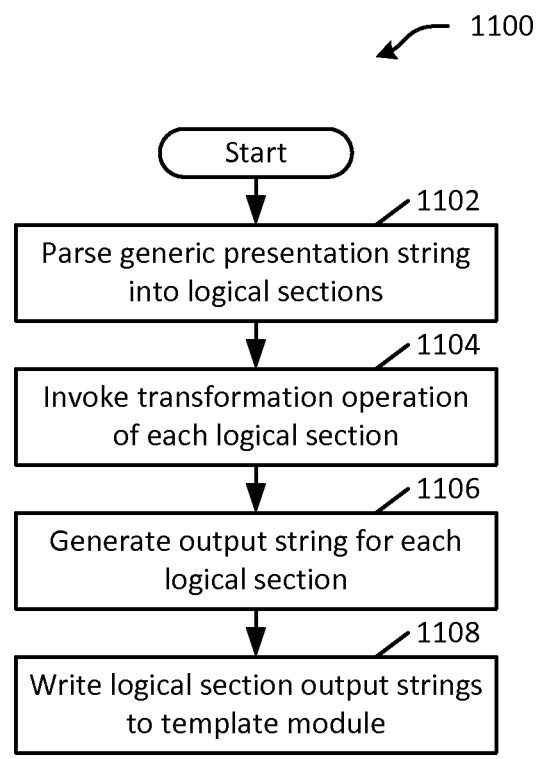
FIG. 11 is a flowchart illustrating an example transformation operation to generate a template module from a generic presentation string.

Various embodiments of the conversion system 802 generate the updated version of the template module 206A in various ways. FIG. 11, described in detail below, illustrates one example way that the conversion system 802 can generate the updated version of the template module 206A. Readers will understand that the conversion system 802 can perform other operations to generate the updated version of the template module 206A.

At some time after the conversion system 802 generates the updated version of the template module 206A, the web server 210 receives a template request from the client application 110 (1014). The template request comprises a request for the template module 206A. In response to receiving the template request, the web server 210 sends the updated version of the template module 206A to the client application (1016). The client application 110 can then use the updated version of the template module 206A to generate presentation strings renderable to present filled templates. Slots in the unfilled template are replaced by data in the filled templates.

In an alternate embodiment, the editor application 706 converts the updated version of the generic template file 800A to a template module. In this example, the save request can comprise the template module.

FIG. 11 is a flowchart illustrating an example transformation operation 1100 to generate a template module from a generic presentation string. After the operation 1100 starts, the conversion system 802 parses the generic presentation string to find different kinds of logical sections. In one embodiment these sections are delimited by several string tokens that are recognized by the conversion system 802. Different kinds of logical sections that might be recognized include, but are not limited to conditional logic, looping logic, variable declarations, data binding expressions, rendering expressions, other metadata or information about the template module logic and literal presentation content (1102).

In this example, the logical sections belong to a plurality of types. For example, sections associated with variable declaration, conditional logic choices or data structure looping can be treated as one type, sections associated with data binding or data rendering expressions can be treated as another type, and literal content sections can be treated as yet another type. Each section type is associated with a different output operation. The output operations generate output strings based on content of the section.

After the conversion system 802 generates the logical sections, the conversion system 802 invokes the transformation and output operation of the each of the sections (1104).

The logical section content strings can be static strings or script strings. Static strings do not include instructions evaluated during the execution of the template module 206A. For example, "<table>" can be a static string. Script strings are evaluated during the execution operation of the template module 206A.

After transforming the logical sections, the conversion system 802 generates the output strings (1106). The conversion system 802 writes the logical section output strings to the template module 206A (1108). When the template execution operation of the template module 206A is invoked, the template module 206A generates a presentation string by evaluating the script strings in the logical sections associated with variable declaration, conditional choices and looping to control the template execution logic and the sections associated with data binding and rendering are executed to retrieve the data elements from the content resources and combine them with the static literal content string sections. The template module 206A then combines the resulting strings into the filled template presentation string. For example, the following may be a portion of a databinding and rendering expression section:

'<H2>Title:'+$urlHtmlEncode(ctx.CurrentItem["Title"])+
'</H2>'

In this example, the template module 206A can evaluate the databinding and rendering expression and find the "Title" content resource object of the current context object and generate the presentation string by combining its value with the literal presentation content strings. The client application 110 can render this string to show an H2 element containing the text "Title: Sales Figures 2009" as header content recognized as level 2.

Figure 12:
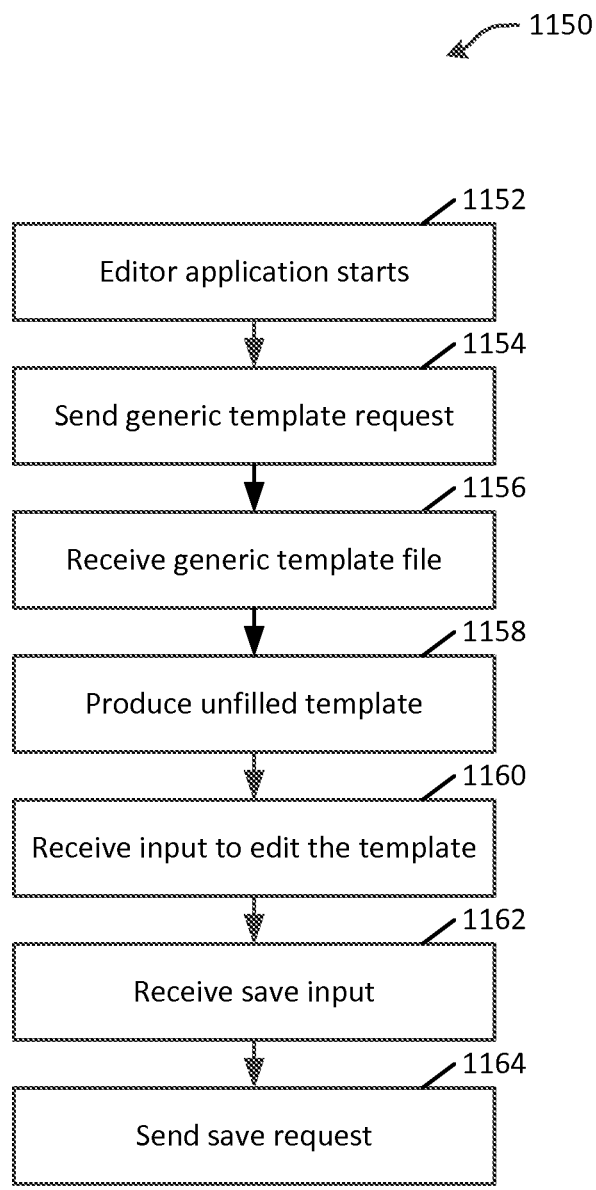
FIG. 12 is a flowchart illustrating an example operation of an editor application.

FIG. 12 is a flowchart illustrating an example operation 1150 of the editor application 706. The example of FIG. 12 is explained with reference to the template module 206A and the generic template file 800A. Readers will understand that the server system 102 can perform similar operations with regard to other ones of the template modules 206 and other ones of the generic template files 800.

After the operation 1150 starts, the editor application 706 starts (1152). In various embodiments, the editor application 706 starts in response to various events. For example, in some embodiments, the editor application 706 starts in response to input from the admin 708.

After the editor application 706 starts, the editor application 706 sends a generic template request to the web server 210 (1154). The presentation data request comprises a request for the generic template file 800A. After sending the generic template request to the web server 210, the editor application 706 receives the generic template file 800A from the server system 102 (1156).

In various embodiments, the generic template request conforms to various communication protocols. For example, in some embodiments, the generic template request conforms to the WebDAV protocol. In another example, the generic template request conforms to the File Transfer Protocol, the HTTP protocol, or another communication protocol.

After receiving the generic template file 800A, the editor application 706 renders the generic presentation string in the generic template file 800A to present an unfilled template (1158). During the time that the editor application 706 displays the unfilled template, the editor application 706 receives input from the admin 704 to edit the unfilled template (1160). For example, the editor application 706 can receive input to add, remove, reposition, or resize slots in the unfilled template. In another example, the editor application 706 can receive input to add static text, images, tables, or formatting to the unfilled template.

Subsequently, the editor application 706 receives save input from the admin 704 (1162). In response to receiving the save input, the editor application 706 sends a save request to the web server 210 (1164). As described above, one or more systems within the server system 102 will process the data in the save request to store the updated version of the generic template file 800A in the data storage system 200.

Figure 13:
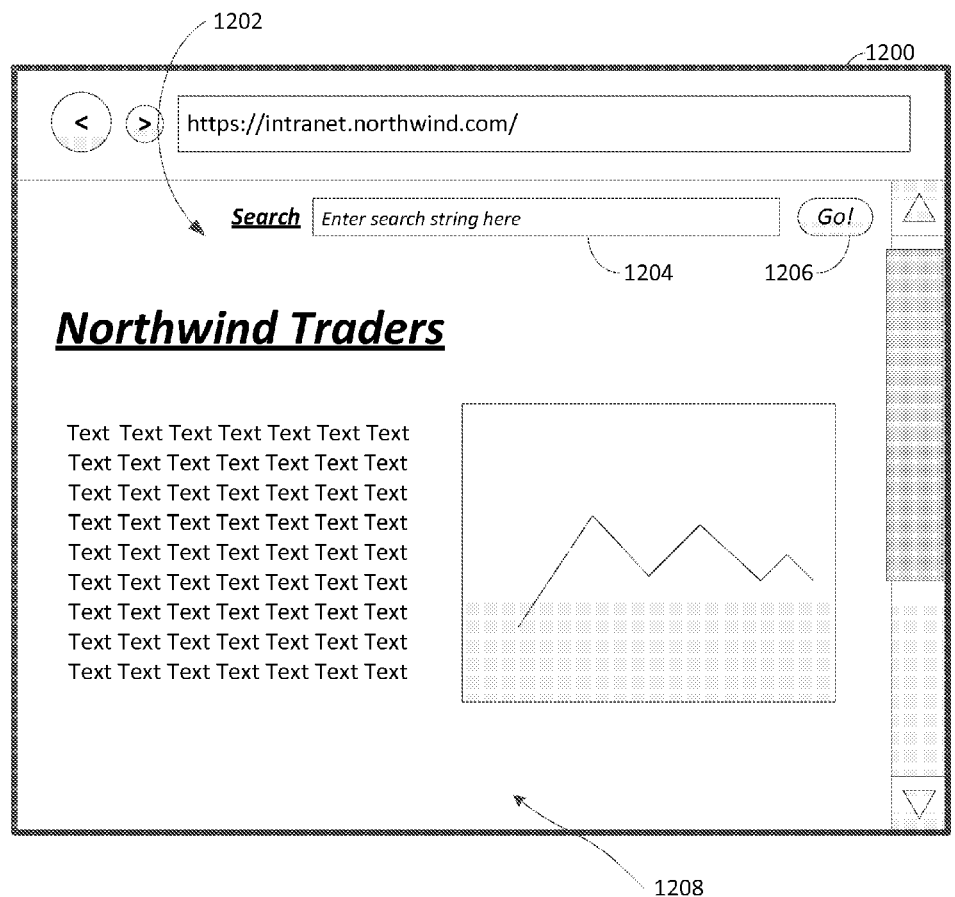
FIG. 13 is a screen illustration showing a browser window containing an example search interface presented by the client device.

FIG. 13 is a screen illustration showing a browser window 1200 containing an example search interface 1202 presented by the client device 104. The user 108 uses one or more search interfaces such as the search interface 1202 to search for resources in the website 112. The search interfaces enable the user 108 to enter search strings and submit search requests. The search requests comprise requests for lists of resources in the website 112 that satisfy the search strings. After receiving and accepting a search request, the server system 102 provides a dataset to the client device 104. The dataset includes data regarding the resources that satisfy the search string of the search request.

As illustrated in the example of FIG. 13, the search interface 1202 includes a textbox 1204 into which the user 108 can enter a search string. The search interface 1202 also includes a submit button 1206. The user 108 can select the submit button 1206 to provide a search request to the server system 102. The search request specifies the search string entered in the textbox 1204. As illustrated in the example of FIG. 13, the search interface 1202 can also include other features 1208, such as a title, text, images, and so on. Furthermore, as illustrated in the example of FIG. 13, presentation of the search features (i.e., the textbox 1204 and the submit button 1206) of the search interface 1202 may not be the primary purpose of the search interface 1202. Alternatively, a search request can be preconfigured and stored in the system instead of being directly submitted by the user 108.

Figure 14:
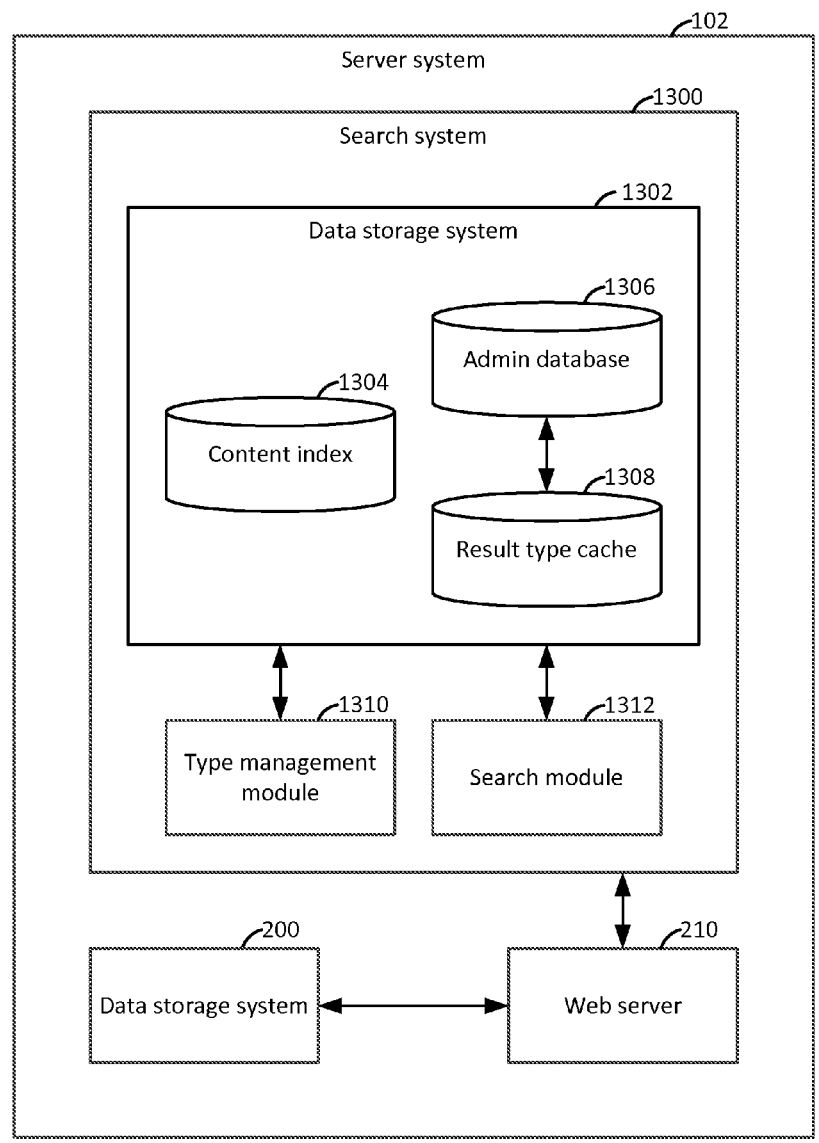
FIG. 14 is a block diagram illustrating example components of another alternate embodiment of the server system.

FIG. 14 is a block diagram illustrating example components of an alternate embodiment of the server system 102. As illustrated in the example of FIG. 14, the server system 102 comprises the data storage system 200 and the web server 210. Although not illustrated in the example of FIG. 14 for the sake of clarity, the data storage system 200 can store the content resources 202, the metadata 204, the template modules 206, the schema 208, the generic template files 800, and other data. Furthermore, the server system 102 can provide the conversion system 802.

In addition to the data storage system 200 and the web server 210, the server system 102 provides a search system 1300. The web server 210 and the search system 1300 can be provided by the same or different computing devices within the server system 102. The server system 102 can provide the search system 1300 by executing instructions stored on one or more computer storage media.

The search system 1300 accesses a data storage system 1302. The data storage system 1302 comprises one or more computer storage media. In some embodiments, the computer storage media in the data storage system 1302 are geographically dispersed. In other embodiments, the computer storage media in the data storage system 1302 are located within a single device or data center. Furthermore, in some embodiments, the data storage system 1302 is part of the data storage system 200, or vice versa.

The data storage system 1302 stores a content index 1304, an admin database 1306, and a result type cache 1308. The content index 1304 comprises data structures for storing a set of entries. Each of the entries in the content index 1304 stores properties of different ones of the content resources 202. The admin database 1306 comprises data structures that store information regarding result types.

Figure 15:
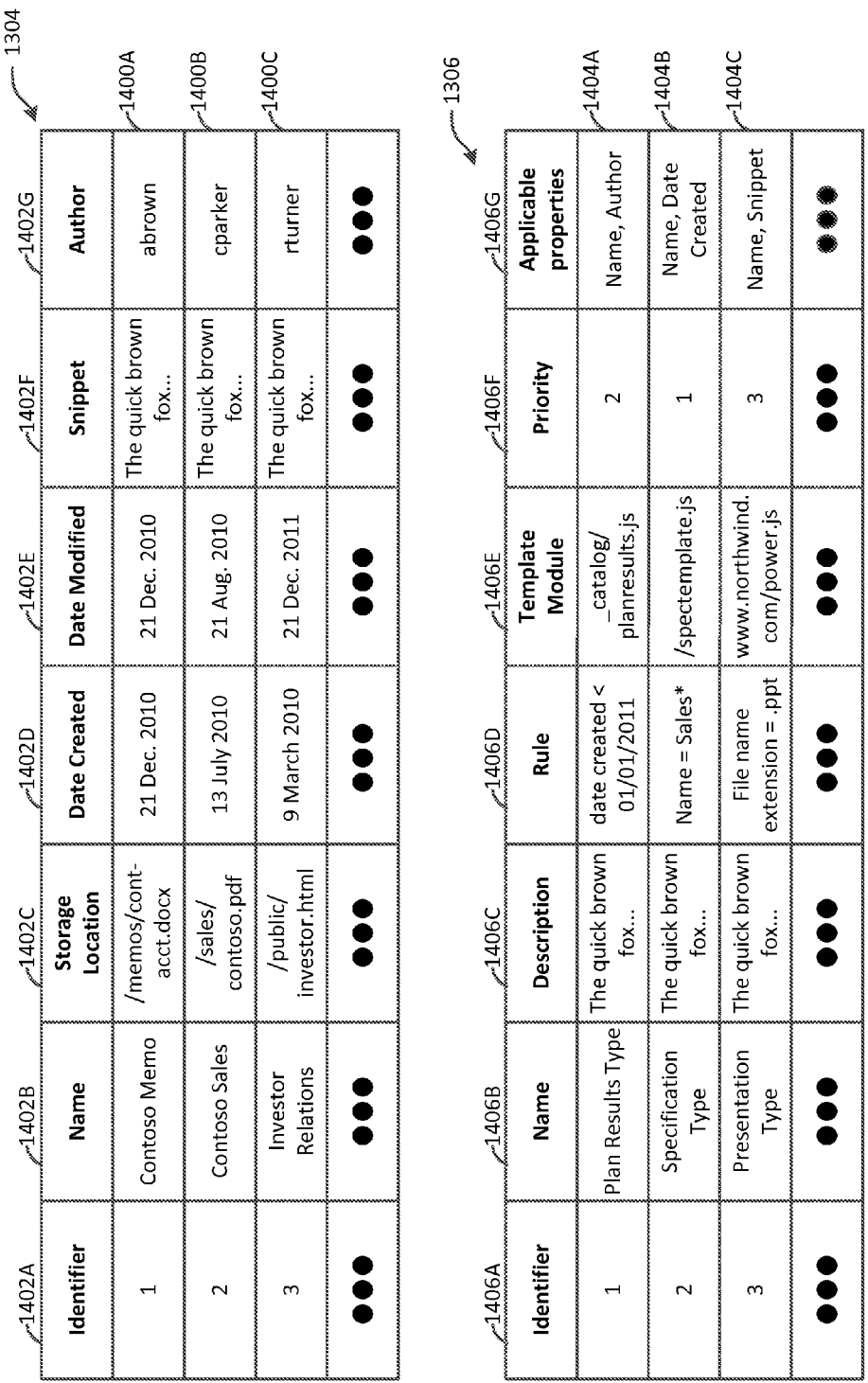
FIG. 15 illustrates example content of a content index and example contents of an admin database.

FIG. 15 illustrates example contents of the content index 1304 and example contents of the admin database 1306. As illustrated in the example of FIG. 15, the content index 1304 comprises a table having rows 1400A-C (collectively, "rows 1400") and columns 1402A-G (collectively, "columns 1402"). The rows 1400 and the columns 1402 define an array of cells. The cells in each of the rows 1400 correspond to a different entry in the content index 1304. The rows 1400 include entries for the content resources 202. For example, the row 1400A corresponds to a particular resource and the row 1400B corresponds to another resource. It will be appreciated that the content index 1304 can include more or fewer than three entries. The ellipses in the example of FIG. 15 indicate that the content index 1304 can include additional rows. Alternatively, the content index may store the data and resources in a format that does not correspond to a table, and will return collections of content resources 202 by accessing that data store to return content resource objects.

Each of the columns 1402 corresponds to a different property. In the example of FIG. 15, the columns 1402A-G correspond to an "identifier" property, a "name" property, a "storage location" property, a "date created" property, a "date modified" property, and a "snippet" property, and an "author" property, respectively. Other embodiments of the content index 1304 include columns for more, fewer, or different properties.

As illustrated in the example of FIG. 15, the admin database 1306 includes a table having rows 1404A-C (collectively, "rows 1404") and columns 1406A-G (collectively, "columns 1406"). The rows 1404 and the columns 1406 define an array of cells. The cells in each of the rows 1404 correspond to a different result type. For example, the row 1404A corresponds to one result type and the row 1404B corresponds to a different result type. Each of the columns 1406 corresponds to different data element properties of the result types. In the example of FIG. 15, the columns 1406A-F correspond to an "identifier" property, a "name" property, a "description" property, a "rule" property, a "template module" property, a "priority" property, and an "applicable properties" property, respectively. The values for the "rule" property in column 1406D specify rules that define which resources belong to a result type. The values for the "template module" property in column 1406E identify one of the template modules 206 corresponding to the result types. Other embodiments of the admin database 1306 include columns for more, fewer, or different properties.

Continuing reference is now made again to the example of FIG. 14. In addition to the data storage system 1302, the search system 1300 provides a type management module 1310 and a search module 1312. The search system 1300 can provide the type management module 1310 and the search module 1312 by reading computer-executable instructions from one or more computer-readable media and executing the computer-executable instructions. The type management module 1310 creates, edits, and deletes at least some of the result type entries in the admin database 1306 in response to the administrative input from the admin 704. For example, the type management module 1310 can, in response to receiving the administrative input from the admin 704, change a rule of a result type or change which of the template modules 206 corresponds to a result type. By causing the type management module 1310 to create, edit, or delete result type entries in the admin database 1306, the admin 704 can configure search result interfaces in the website 112 to display information about different types of search results in different ways.

The search module 1312 receives the search requests from the user 108. The user 108 can submit the search requests using search interfaces, such as the search interface 1202. Upon receiving from the client device 104 a search request for resources in the website 112 that satisfy a search string, the search module 1312 accesses entries in the admin database 1306 to retrieve the rule properties of the result types. Some embodiments use the result type cache 1308 to accelerate retrieval of the properties of the result types from the admin database 1306. Upon receiving the rules of the result types, the search module 1312 uses the content index 1304 to identify ones of the content resources 202 in the website 112 that satisfy conditions specified by the search string. The search module 1312 retrieves, for each of the result types, the properties of the identified resources needed to evaluate the rules of the result types.

The search module 1312 evaluates the rules of the result types against the retrieved properties of the identified resources to determine result types of the identified resources. The search module 1312 can use various algorithms to evaluate the rules. For example, the search module 1312 can be implemented as a forward-chaining rules engine.

After determining that a given resource belongs to a given result type, the search module 1312 generates a content resource object belonging to a type that corresponds to the given result type's template module. The given resource's content resource object includes each applicable data element property of the given resource. The given resource's applicable properties are the properties of the identified resource that are applicable to the identified resource's result type. For example, if the "applicable properties" property 1406G of identified resource's result type designates the "snippet" property 1402F, the identified resource's data element includes the identified resource's "snippet" property.

After generating data elements for each of the identified resources, the search module 1312 sends a dataset to the client device 104. The dataset includes the rows and their data element for the identified resources. In some embodiments the received data can include schema and template modules data in the same package with the dataset, in other embodiments the schema and template modules may be cached in the client application or retrieved in a separate step. When the client device 104 receives the dataset, the client application 110 processes the dataset in the manner described above.

Figure 16:
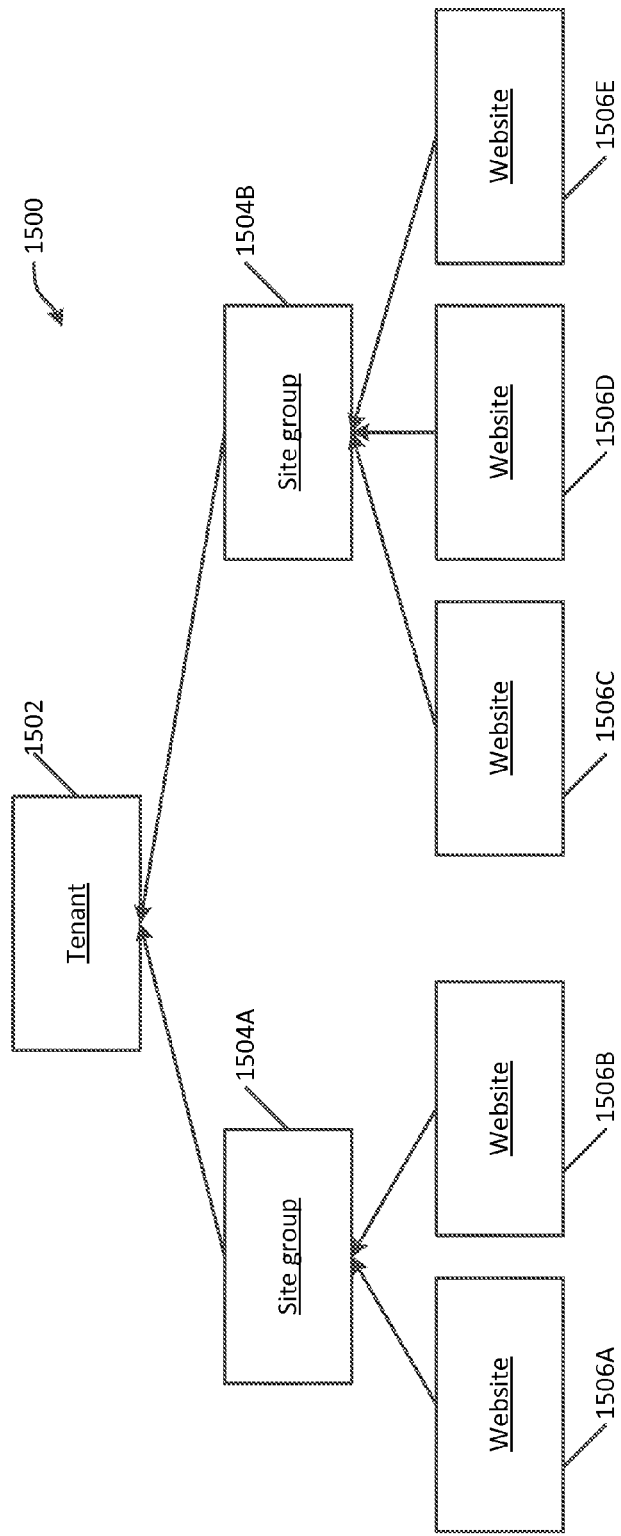
FIG. 16 illustrates an example scope hierarchy.

FIG. 16 illustrates an example scope hierarchy 1500. In some embodiments, the server system 102 hosts multiple distinct websites. The server system 102 can host these websites on behalf of a single organization. Alternately, a service provider entity can operate the server system 102 and the server system 102 can host these websites on behalf of multiple tenants. Tenants include organizations, such as companies, or individuals that arrange with a service provider entity of the server system 102 for the provider to host websites for the tenants. From the point of view of a tenant, the server system 102 only hosts the tenant's websites and not the websites of other tenants. In some instances, the server system 102 can host multiple websites for a single one of the tenants. In such instances, the tenant can group two or more of its websites into site groups. The tenant can authorize the admin 704 to perform administration tasks on one or more of the tenant's websites, such as the website 112.

As illustrated in the example of FIG. 16, a tenant 1502 has two site groups 1504A and 1504B (collectively, "site groups 1504"). The site group 1504A includes websites 1506A and 1506B. The site group 1504B includes websites 1506C, 1506D, and 1506E. This document can refer to the websites 1506A, 1506B, 1506C, 1506D, and 1506E collectively as "websites 1506." The website 112 can be one of the websites 1506.

The server system 102 can provide multiple admin interfaces. Each of the admin interfaces has a different scope. For example, a first admin interface can have a tenant-wide scope, a second admin interface can have a site group-wide scope, a third admin interface can have a website-wide scope, and so on. In the example of FIG. 16, the server system 102 can provide an admin interface for the tenant 1502, an admin interface for the site group 1504A, an admin interface for the site group 1504B, and separate admin interfaces for each of the websites 1506. The admin interface for the tenant 1502 enables the admin 704 to configure settings that are generally applicable to the tenant 1502. The admin interfaces for the site groups 1504 enable the admin 704 to independently configure the site groups 1504. The admin interfaces for the websites 1506 enable the admin 704 to independently configure the websites 1506.

The admin interfaces include type configuration interfaces. Each type configuration interface is a user interface, such as a GUI, that includes features that enable the admin 704 to configure (e.g., create or modify) result types applicable within the type configuration interface's scope. The type configuration interface's scope is the same as the scope of the admin interface that includes the type configuration interface. For example, the admin 704 can use the type configuration interface within the admin interface for the website 1506A to configure result types applicable to the website 1506A. When the admin 704 uses a type configuration interface within the admin interface for one of the site groups 1504, the given result type is applicable to each website in the site group. For example, the admin 704 can use the type configuration interface within the admin interface for the site group 1504B to configure result types applicable to websites in the site group 1504B, but not result types applicable to websites in the site group 1504A.

Figure 17:
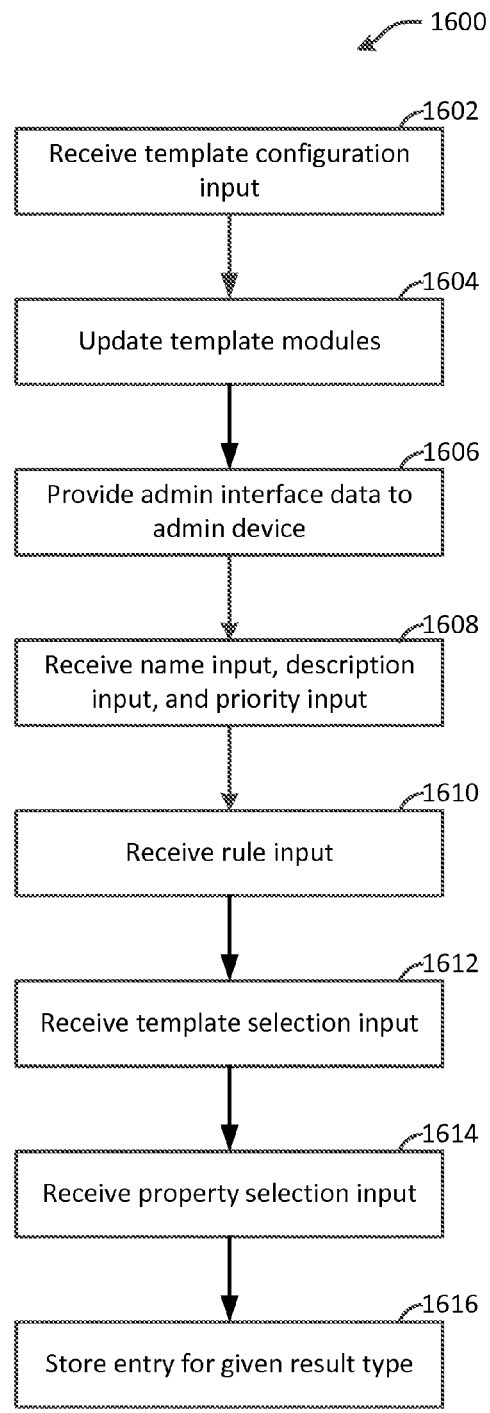
FIG. 17 is a flowchart illustrating an example operation to configure a result type.

FIG. 17 is a flowchart illustrating an example operation 1600 to configure a result type. In the operation 1600, the type management module 1310 receives template configuration input from the admin device 702 (1602). The template configuration input specifies information about a new or existing template module. The type management module 1310 updates the template modules 206 in response to the template configuration input (1604). For instance, the type management module 1310 can store a new template module in the data storage system 200 or modify an existing one of the template modules 206 in the data storage system 200.

In various embodiments, the type management module 1310 receives the template configuration input in various ways. For example, in some embodiments, the type management module 1310 receives the template configuration input from a separate application, such as a web design suite or an integrated development environment. In other embodiments, the type management module 1310 provides data representing a template configuration interface to the admin device 702. For example, the type management module 1310 can provide HTML data, CSS data, scripting data, and or other types of data that the admin device 702 can render or interpret to present the template configuration interface to the admin 704. The template configuration interface includes features that enable the admin 704 to create a new template module or edit an existing one of the template modules 206.

Furthermore, in the operation 1600, the type management module 1310 provides admin interface data to the admin device 702 (1606). The admin interface data represents a type configuration interface within an admin interface. For instance, the admin interface data can represent a type configuration interface within an admin interface for the tenant 1502, admin interfaces for the site groups 1504, or admin interfaces for the websites 1506.

The type configuration interface is a user interface that enables the admin 704 to configure a given result type. In various embodiments, the type configuration interface comprises various types of user interfaces. For example, the type configuration interface can comprise a GUI that includes features, such as data entry features, that enable the admin 704 to configure (e.g., create or modify) a given result type. In another example, the type configuration interface can be a command line interface, such as a POWERSHELL™ interface.

In various embodiments, the admin interface data can include various types of data. For example, the admin interface data can include Hypertext Markup Language (HTML) data, Cascading Style Sheet (CSS) data, scripting data, and other types of data. In this example, a web browser application or another application operating on the admin device 702 renders or processes the admin interface data to present the type configuration interface.

Figure 18:
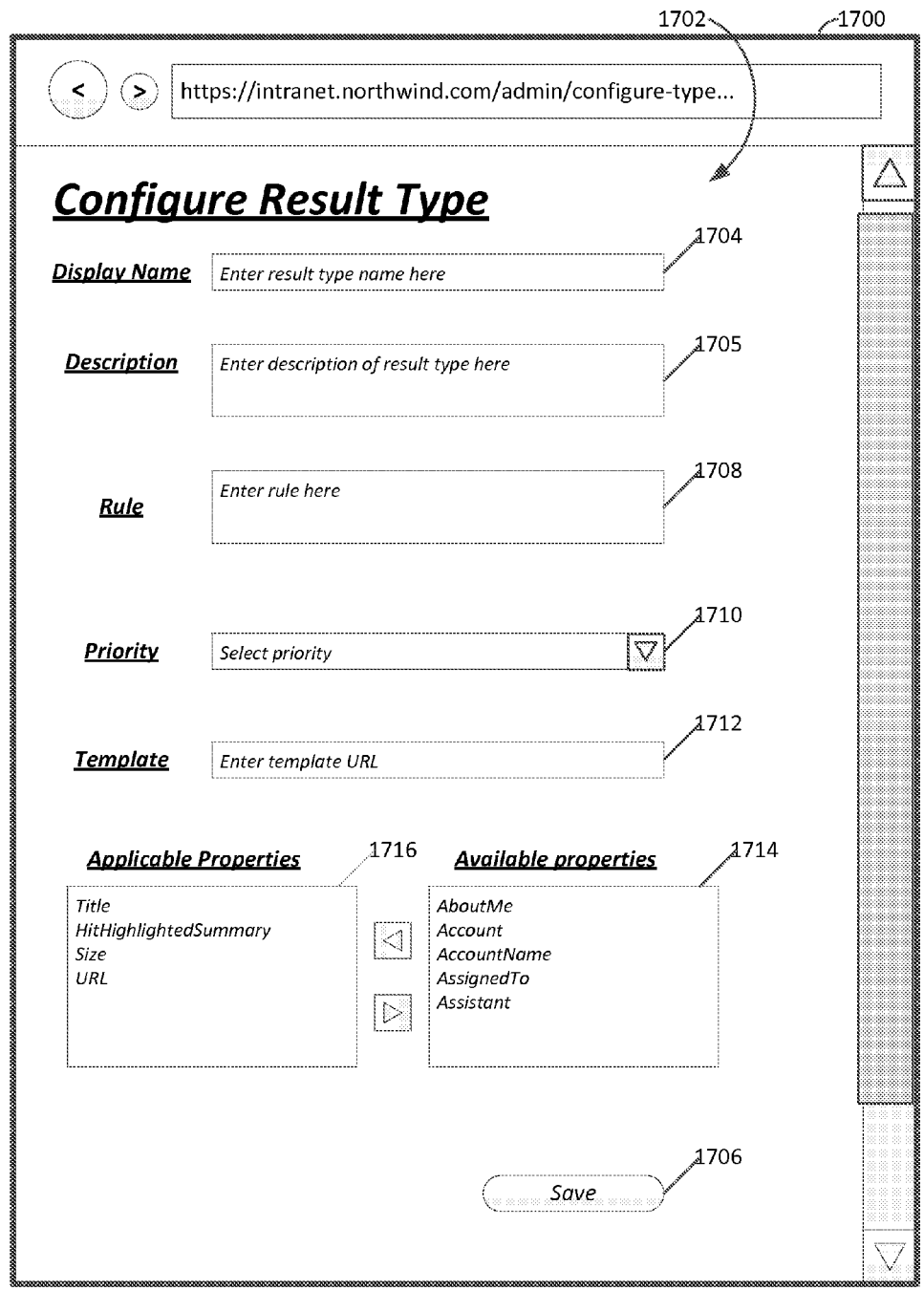
FIG. 18 is a screen illustration of a browser window containing an example type configuration interface.

FIG. 18 is a screen illustration of a browser window 1700 containing an example type configuration interface 1702. The type management module 1310 can provide the admin interface data representing the type configuration interface 1702 to the admin device 702. A browser application running on the admin device 702 renders the admin interface data to display the type configuration interface 1702. This document describes features of the example type configuration interface 1702 in relation to steps in the operation 1600.

Continuing reference is now made again to the example of FIG. 17. After providing the admin interface data to the admin device 702, the type management module 1310 receives name input, description input, and priority input from the admin 704 (1608). The name input specifies a display name for the given result type. For example, the name input can specify "Technical Specification Type" or "Sideshow Type" as display names for the given result type. The description input specifies a textual description of the given result type. For example, the description input can specify "The Technical Specification Type is used in search result pages to display information about technical specification documents." The priority input specifies a priority for the given result type. For example, the admin 704 can assign a priority of "10" to the given result type and assign a priority of "4" to another result type. The search module 1312 can use the priorities of the result types to select a result type for a resource from among multiple result types applicable to the resource.

In various embodiments, the type management module 1310 receives the name input, the description input, and the priority input in various ways. For example, the type configuration interface 1702 of FIG. 18 includes a display name feature 1704, a description feature 1705, and a priority feature 1710. The admin 704 is able to enter a display name for the given result type in the display name feature 1704. The admin 704 is able to enter a description of the given result type in the description feature 1705. The admin 704 is able to use the priority feature 1710 to select a priority level. In addition, the type configuration interface 1702 includes a save control 1706. When the admin 704 selects the save control 1706, the admin device 702 provides data entered in the controls of the type configuration interface 1702 to the type management module 1310. In this way, the type management module 1310 receives name input specifying the display name entered by the admin 704 in the display name feature 1704, description input specifying the description entered by the admin 704 in the description feature 1705, and priority input specifying the priority level selected by the admin 704 in the priority feature 1710. In some instances, this document refers to data entered in a data entry control as data corresponding to the data entry control.

Reference is made again to the example of FIG. 17. Furthermore, the type management module 1310 receives rule input from the admin 704 (1610). The rule input specifies a rule containing one or more conditions that resources must satisfy in order to be considered to belong to the given result type. In various embodiments, the type management module 1310 receives the rule input in various ways.

For example, the type configuration interface 1702 of FIG. 18 includes a rule feature 1708. The admin 704 can enter a rule for the given result type in the rule feature 1708. For example, the admin 704 can make the given result type applicable to resources having a given file name extension by entering the given file name extension in the rule feature 1708. In this example, the admin 704 can enter the file name extensions ".docx" and ".doc" in the rule feature 1708 to make resources having file name extensions ".docx" or ".doc" belong to the given result type.

In another example, the admin 704 can enter one or more URL patterns in the rule feature 1708. For example, the admin 704 can enter the URL pattern "/docs/spec_*" in the rule feature 1708. In this example, resources having URLs that start with the sub-string "/docs/spec_" can belong to the given result type. Use of URL patterns as conditions in a rule for a result type can be helpful when an entity uses particular directories or file naming conventions to distinguish different types of resources. For example, the entity can use a file naming convention that requires all technical specification documents to begin with the string "spec" and requires all invention records to begin with the string "invent." In this example, the admin 704 can take advantage of this file naming convention to associate technical specification documents and invention records with different result types. This is one example way that resources having the same file format can belong to different result types. For instance, a first resource and a second resource can both be word processor documents, slide presentation documents, webpages, PDF documents, spreadsheet documents, images, audio files, video files, or other types of documents having the same file format, but belong to different result types.

In other examples, the admin 704 can specify rules having conditions based on other types of conditions and combinations of conditions. For example, the admin 704 can specify a rule having conditions based on creation times, edit times, titles, or other properties of the content resources 202.

When the admin 704 selects the save control 1706, the admin device 702 provides the information entered into the rule feature 1708 to the type management module 1310. In this way, the type management module 1310 receives rule input specifying the rule entered by the admin 704 in the rule feature 1708.

Continuing reference is now made again to FIG. 17. Furthermore, the type management module 1310 receives template selection input from the admin 704 (1612). The template selection input associates the given result type with one of the template modules 206 stored in the data storage system 200. In some instances, the template selection input can indicate the template module that the admin 704 created or edited in step 1602.

In various embodiments, the type management module 1310 receives the template selection input in various ways. For example, the type configuration interface 1702 of FIG. 18 includes a template selection control 1712. The admin 704 is able to enter a URL or other identifier of a template module in the template selection control 1712. In the example of FIG. 18, the template selection control 1712 is a text box. However, in other embodiments, the template selection control 1712 is a drop box. In such embodiments, the template selection control 1712 displays a list of names of the template modules 206. The admin 704 can then select one of the template modules from among the list of names of the template modules 206 in the template selection control 1712. When the admin 704 selects the save control 1706, the admin device 702 provides template selection input to the type management module 1310. The template selection input indicates the template module selected in the template selection control 1712 by the admin 704.

Reference is now made again to the example of FIG. 17. The type management module 1310 receives property selection input from the admin 704 (1614). The property selection input indicates the applicable properties of the given result type.

In various embodiments, the type management module 1310 receives property selection input from the admin 704 in various ways. For example, the type configuration interface 1702 of FIG. 18 includes an available properties field 1714 and an applicable properties field 1716. The available properties field 1714 contains a list of properties of resources. The applicable properties field 1716 contains a list of the applicable properties of the given result type. The admin 704 can make one of properties listed in the available properties field 1714 into an applicable property of the given result type by moving the property from the available properties field 1714 to the applicable properties field 1716.

When the admin 704 selects the save control 1706, the admin device 702 provides the list of properties in the applicable properties field 1716 to the type management module 1310. In this way, the type management module 1310 receives property selection input specifying the applicable properties of the given result type.

Subsequently, the type management module 1310 stores in the admin database 1306 a new or updated entry for the given result type (1616). The entry for the given result type includes a set of properties. These properties include a name property that specifies the type name indicated by the name input, a description property that specifies the description specified by the description input, a priority property that specifies the priority level specified by the priority input, a rule property that specifies a rule indicated by the rule input, a template property that specifies the template module indicated by the template selection input, and an applicable properties property that specifies the properties indicated by the property selection input.

It should be appreciated that the server system 102 can perform some or all of the operation 1600 multiple times. As a result, the server system 102 can provide admin interface data to the admin device 702 multiple times and receive name input, rule input, priority selection input, template configuration input, and template selection input multiple times for multiple different result types. Thus, by performing at least some of the operation 1600 multiple times, the admin 704 can provide administrative input associating a first template module with a first result type and administrative input associating a second template module with a second result type. Likewise, by performing at least some of the operation 1600 multiple times, the admin 704 can provide administrative input to associate a given name, rule, template module, or priority with a first result type and then later provide additional administrative input to associate a different name, rule, template module or priority with the first result type.

Figure 19:
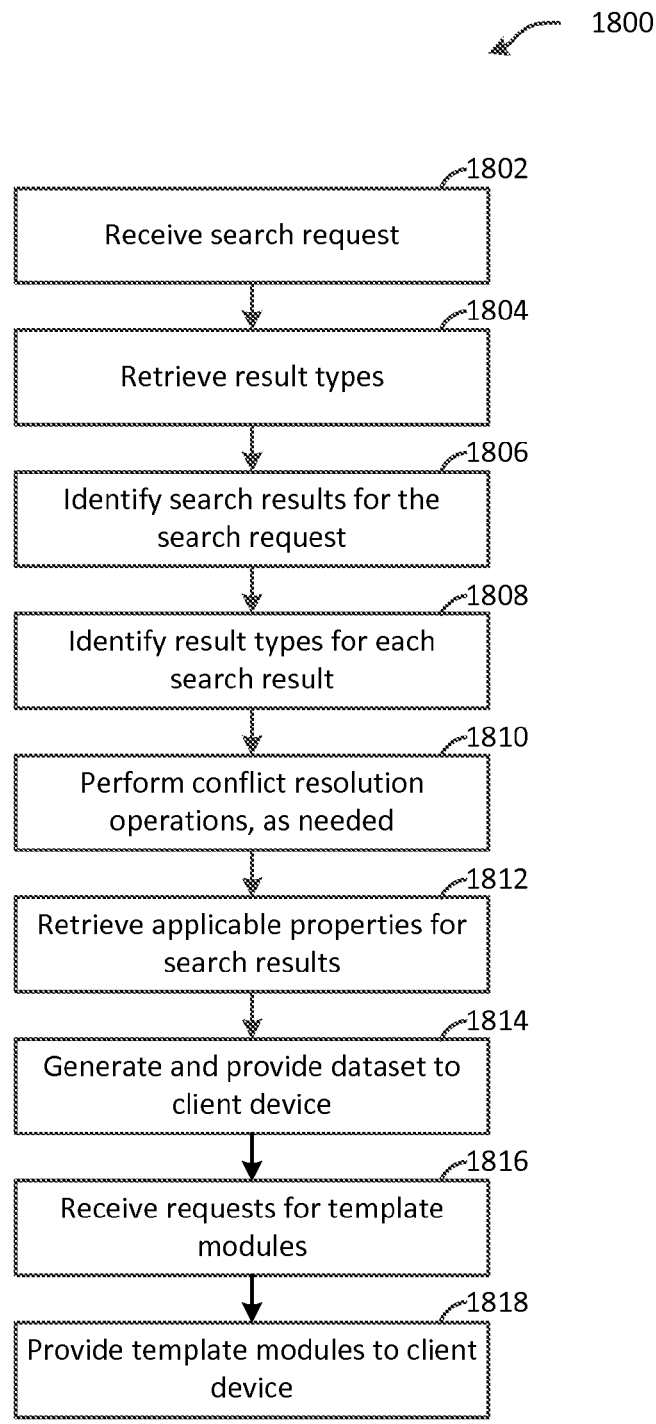
FIG. 19 is a flowchart illustrating an example operation to search for resources in a target website.

FIG. 19 is a flowchart illustrating an example operation 1800 to search for resources in a target website. In the operation 1800, the search module 1312 receives a search request from the user 108 (1802). The search request requests a list of resources in the target website that satisfy a search string specified by the search request. For ease of explanation, this document assumes that the target website is the website 112. In some embodiments, the search module 1312 receives the search request when the user 108 selects the submit button 1206 in the search interface 1202 (FIG. 12).

The search string in the search request specifies one or more conditions. For example, the search request can comprise the following search string: "Contoso." In this example, resources associated with the word "Contoso" satisfy the search string. In another example, the search request can comprise the following search string: "Contoso and createdbefore: Jul. 1, 2009." In this example, resources that are associated with the word "Contoso" and that were created before Jul. 1, 2009 satisfy the conditions of the search string. In various embodiments, the search module 1312 can accept search strings conforming to various query formats. For example, some embodiments of the search module 1312 can accept search strings conforming to the Advanced Query Syntax (AQS).

After receiving the search request, the search module 1312 retrieves result types from the admin database 1306 (1804). The search module 1312 identifies search results for the search request (1806). The search results for the search request are resources of the website 112 that satisfy conditions specified by the search string in the search request. For example, the search module 1312 can determine that a first resource of the website 112 and a second resource of the website 112 satisfy the conditions specified by the search string. In this example, the first resource and the second resource are search results for the search request.

As discussed above, the server system 102 can host multiple websites. These websites can be associated with one or more tenants. In many instances, the search module 1312 does not identify or provide information about resources that satisfy the search string of the search request but that are not in the target website for the search request (e.g., the website 112). If the search module 1312 were to provide search results from websites other than the target website, the user could become confused, private information could be revealed, or other negative consequences could occur.

Various embodiments of the search module 1312 identify search results for the search request in various ways. For example, the search module 1312 can perform a linear scan of the content index 1304 to identify the search results. In another example, the search module 1312 can use another index to identify the search results.

After the search module 1312 identifies the search results for the search request, the search module 1312 identifies result types for each of the search results (1808). To identify a result type for a search result, the search module 1312 evaluates rules for result types. The result type entries in the admin database 1306 include properties that specify the rules for the result types. If the search result satisfies a rule for a result type, the search result belongs to that result type. To determine whether a search result satisfies a rule for a result type, the search module 1312 may need to retrieve one or more properties of the search result from the content index 1304.

In some instances, a search result can belong to multiple result types. In other words, the search result can satisfy the conditions of rules for multiple result types. For example, search results can belong to a first result type when the search results have the file name extension ".pptx." Furthermore, in this example, search results can belong to a second result type when the search results have URLs that include the string "spec." In this example, a particular search result can have the file name extension ".pptx" and have also have a URL that includes the string "spec."

Because search results can belong to multiple result types, the search module 1312 performs conflict resolution operations as needed to select one result type for the search results from among the multiple applicable result types (1810). In various embodiments, the search module 1312 can perform various conflict resolution operations to select a particular one of the result types for the search result. For example, the search module 1312 can perform a conflict resolution operation that involves hierarchical collections of websites. As described above, the server system 102 can host multiple websites 1506 for the tenant 1502. In this example, the tenant 1502 has grouped the websites 1506 into the site groups 1504. Furthermore, in this example, result types associated with elements lower on the scope hierarchy 1500 take precedence in the conflict resolution operation over relatively higher elements in the scope hierarchy 1500. For instance, the admin 704 can specify that the scope of a first result type is the website 1506A and can specify that the scope of a second result type is the site group 1504A. In this instance, if a search result belongs to both the first result type and the second result type, the conflict resolution operation chooses the first result type for the search result instead of the second result type because the first result type is associated with a lower element in the scope hierarchy 1500.

In another example conflict resolution operation, the admin 704 can assign numerical priorities to result types. For instance, the admin 704 can assign a priority of "10" to a first result type and a priority of "4" to a second result type. In this instance, a search result can satisfy the rules for the first result type and the second result type. However, the conflict resolution operation assigns the first result type to the search result and not the second result type because the first result type has a higher priority number than the second result type. In yet another example conflict resolution operation, the search module 1312 chooses the result type that was created earlier or listed earlier in the content index 1304.

After identifying the result types, the search module 1312 retrieves applicable properties of the search results from the content index 1304 (1812). The applicable properties of a search result are properties of the search result designated as the applicable properties of the search result's result type. For example, the search result's result type can designate a "URL" property and a "Snippet" property as applicable properties. In this example, the search module 1312 retrieves the value of the "URL" property and the value of the "Snippet" property from the search result's entry in the content index 1304.

After the search module 1312 retrieves the applicable properties of the search result, the search module 1312 generates a dataset and sends the dataset to the client device 104 (1814). The dataset includes result data for at least some of the identified search results. The result data for a search result includes the applicable properties of the search result.

After the search module 1312 provides the dataset to the client device 104, the web server 210 receives requests from the client device 104 for the template modules 206 that correspond to the types of content resource objects in the dataset (1816). In response to the requests, the web server 210 retrieves the template modules from the data storage system 200 and sends the template modules to the client device 104 (1818). After the client device 104 receives the template modules, the client application 110 performs the content generation script. Performance of the content generation script causes the template execution operations of the template modules to be performed on content resource objects in the dataset, thus generating presentation strings for different ones of the identified resources. The client application 110 renders the presentation strings for the search results to present sets of on-screen features describing the identified resources.

In some embodiments, the search module 1312 provides the dataset to the client device 104 at the same time as parts of a larger set of data representing a search result web page. In other embodiments, the search module 1312 sends the dataset to the client device 104 separate from a webpage that contains a listing of the search results. In some such embodiments, the search module 1312 can provide the dataset to the client device 104 using AJAX technology.

It will be appreciated that the server system 102 can perform the operation 1800 multiple times. Consequently, the server system 102 can receive multiple search requests for multiple webpages and can provide different datasets as a result of different search strings, changes to result types, changes to template modules, and various other factors.

Reference is now made again to the example of FIG. 6. As discussed above, the client application 110 can display the search results interface 600 after the client application 110 sends a search request to the server system 102 and the client application 110 receives data from the server system 102 representing the search results interface 600.

The search results interface 600 includes the filled template 604 and the filled template 606. The filled template 604 corresponds to a first search result and the filled template 606 corresponds to a second search result. In some instances, the user 108 can expose filled templates for additional search results by scrolling the search results interface 600. Furthermore, in some instances, search results are paginated across multiple webpages. In such instances, the user 108 can expose additional filled template modules by clicking on a link (not shown) to a next webpage or performing another action to expose the filled template modules for additional search results.

As illustrated in the example of FIG. 6, the search results interface 600 presents different information for different types of search results. Presenting different information for different types of search results can be advantageous for several reasons. For example, it might not be useful to provide a snippet from a slide presentation document because slide presentation documents might not include text representative of the content of the slide presentation document. In contrast, word processor documents are more likely to include text that is representative of the content of the word processor documents. In this example, it may be more helpful to a user to see snippets of word processor documents than slide presentation documents. Thus, the ability of the admin 704 to configure the server system 102 to present different information for different types of search results in a website may enable users to get useful information in search result interfaces. Furthermore, because the admin 704 is able to configure and create result types and to define which resources belong to particular result types, the admin 704 may be able to configure the server system 102 to present information about search results in ways that are unique to the admin's organization.

Furthermore, the use of user interfaces, such as GUIs, to configure the server system 102 may enable less-experienced admins to quickly and cheaply configure the server system 102 to present different information for different types of search results. For instance, the admin 704 does not need to understand or know how to edit XSLT code, JavaScript, HTML, CSS, C++, Perl, or other formal machine-interpretable code in order to configure the server system 102 to provide different information for different types of search results. Rather, the above description explains how the admin 704 can use data entry controls in GUIs to configure the server system 102. Example data entry controls include textboxes, drop boxes, check boxes, text area elements, radio buttons, text areas, buttons, other features of HTML forms, and other user interface features that enable entry of data.

Figure 20:
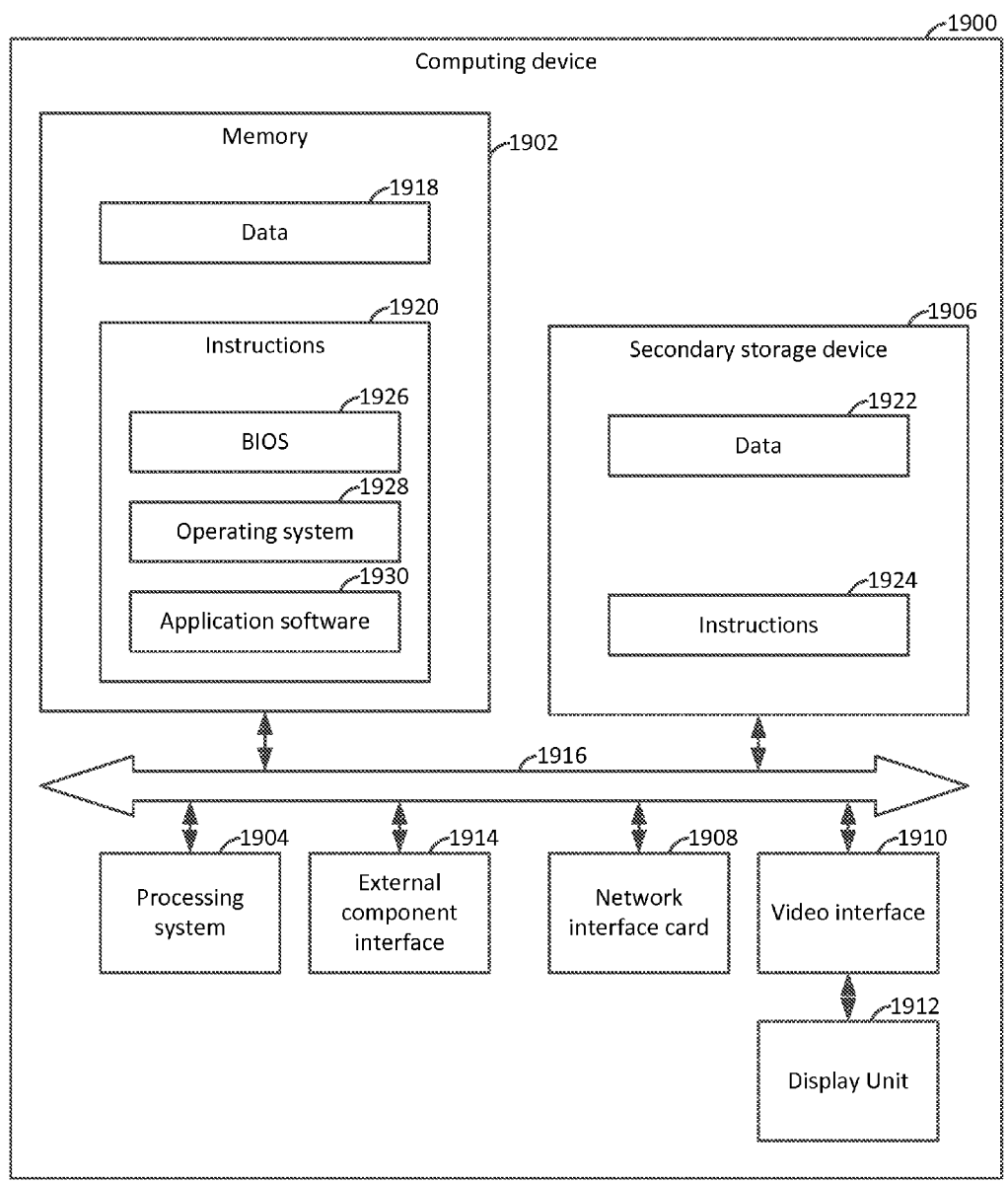
FIG. 20 is a block diagram illustrating example components of a computing device.

FIG. 20 is a block diagram illustrating an example computing device 1900. In some embodiments, the server system 102, the client device 104, and the admin device 702 are implemented as one or more computing devices like the computing device 1900. It should be appreciated that in other embodiments, the server system 102, the client device 104, and the admin device 702 are implemented using computing devices having hardware components other than those illustrated in the example of FIG. 20.

As used herein, the term computer readable media may include computer storage media and communication media. As used in this document, a computer storage medium is a device or article of manufacture that stores data and/or computer-executable instructions. A computer storage medium does not consist of transitory signals. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

In the example of FIG. 20, the computing device 1900 comprises a memory 1902, a processing system 1904, a secondary storage device 1906, a network interface card 1908, a video interface 1910, a display unit 1912, an external component interface 1914, and a communications medium 1916. The memory 1902 includes one or more computer storage media capable of storing data 1918 and/or computer-executable instructions 1920.

The secondary storage device 1906 includes one or more computer storage media. The secondary storage device 1906 stores data 1922 and computer-executable instructions 1924 not directly accessible by the processing system 1904. In other words, the processing system 1904 performs an I/O operation to retrieve data and/or software instructions from the secondary storage device 1906.

The processing system 1904 includes one or more processing units. A processing unit is a physical device or article of manufacture comprising one or more integrated circuits that read data and instructions from computer readable media, such as the memory 1902 and the secondary storage device 1906, and selectively execute the instructions. In various embodiments, the processing system 1904 is implemented in various ways. For example, the processing system 1904 can be implemented as one or more processing cores. In another example, the processing system 1904 can comprise one or more separate microprocessors. In yet another example embodiment, the processing system 1904 can comprise an application-specific integrated circuit (ASIC) that provides specific functionality. In yet another example, the processing system 1904 provides specific functionality by using an ASIC and by executing computer-executable instructions.

The network interface card 1908 is a device or article of manufacture that enables the computing device 1900 to send data to and receive data from a communication network. In different embodiments, the network interface card 1908 is implemented in different ways. For example, the network interface card 1908 can be implemented as an Ethernet interface, a token-ring network interface, a fiber optic network interface, a wireless network interface (e.g., Wi-Fi, WiMax, etc.), or another type of network interface.

The video interface 1910 enables the computing device 1900 to output video information to the display unit 1912. The display unit 1912 can be various types of devices for displaying video information, such as a cathode-ray tube display, an LCD display panel, a plasma screen display panel, a touch-sensitive display panel, an LED screen, or a projector. The video interface 1910 can communicate with the display unit 1912 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 1914 enables the computing device 1900 to communicate with external devices. For example, the external component interface 1914 can be a USB interface, a FireWire interface, a serial port interface, a parallel port interface, a PS/2 interface, and/or another type of interface that enables the computing device 1900 to communicate with external devices. In various embodiments, the external component interface 1914 enables the computing device 1900 to communicate with various external components, such as external storage devices, input devices, speakers, modems, media player docks, other computing devices, scanners, digital cameras, and fingerprint readers.

The communications medium 1916 facilitates communication among the hardware components of the computing device 1900. In the example of FIG. 20, the communications medium 1916 facilitates communication among the memory 1902, the processing system 1904, the secondary storage device 1906, the network interface card 1908, the video interface 1910, and the external component interface 1914. The communications medium 1916 can be implemented in various ways. For example, the communications medium 1916 can comprise a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 1902 stores various types of data and/or software instructions. For instance, in the example of FIG. 12, the computer-executable instructions 1920 in the memory 1902 can include Basic Input/Output System (BIOS) instructions 1926 and operating system instructions 1928. Execution of the BIOS instructions 1926 by the processing system 1904 causes the computing device 1900 to boot up. Execution of the operating system instructions 1928 causes the computing device 1900 to provide an operating system that coordinates the activities and sharing of resources of the computing device 1900. Furthermore, the memory 1902 stores application software 1930. Execution of the application software 1930 by the processing system 1904 causes the computing device 1900 to provide one or more applications. The memory 1902 also stores data 1918. The data 1918 is data used by programs that execute on the computing device 1900.

The various embodiments described above are provided by way of illustration only and should not be construed as limiting. Those skilled in the art will readily recognize various modifications and changes that may be made without following the example embodiments and applications illustrated and described herein. For example, the operations shown in the figures are merely examples. In various embodiments, similar operations can include more or fewer steps than those shown in the figures. Furthermore, in other embodiments, similar operations can include the steps of the operations shown in the figures in different orders. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method for configuring and using search functionality, the method comprising:
    storing one or more resources of a first website hosted by a server system;
    receiving administrative input, the administrative input corresponding to data entry controls in one or more user interfaces, the administrative input associating a first template module with a first result type, the first template module specifying a first template execution operation;
    receiving, a first search request based on user input, the first search request requesting a list of resources in the first website that satisfy a first search string;
    determining that a first resource satisfies the first search string, the first resource being among the one or more resources of the first website;
    determining that the first resource belongs to the first result type;
    after determining that the first resource belongs to the first result type, providing a dataset, the dataset comprising a first content resource object that contains data regarding the first resource, wherein the data regarding the first content resource includes one or more properties designated by the result type for the first resource;
    based on the determination that the first resource belongs to the first result type, receiving a request for the first template module;
    in response to the request for the first template module, providing the first template module; and
    providing a content generation script, performance of the content generation script causing the first template execution operation to be performed on the first content resource object, a first presentation string being generated by performing the first template execution operation on the first content resource object, the first presentation string being renderable to present a first set of on-screen features describing the first resource, wherein the first set of on-screen features include the one or more properties designated by the result type arranged as specified by the first template module.

2. The method of claim 1, wherein a service provider entity operates the server system, the server system hosts a plurality of websites, the plurality of websites including the first website, the server system hosting the first website on behalf of a tenant.

3. The method of claim 2, wherein the plurality of websites includes a second website, a given resource in the second website satisfying the first search string, the server system not providing data identifying the given resource in response to the first search request.

4. The method of claim 1,
    wherein the user interfaces include a type configuration interface, the type configuration interface comprising data entry controls for configuring result types; and
    wherein receiving the administrative input comprises receiving values of the data entry controls.

5. The method of claim 4,
    wherein the data entry controls include a template selection control;
    wherein receiving the administrative input comprises receiving a first template selection input, the first template selection input corresponding to the template selection control, the first template selection input associating the first template module with the first result type; and
    wherein the method thither comprises:
        after providing the dataset, receiving additional administrative input, the additional administrative input comprising a second template selection input, the second template selection input corresponding to the template selection control, the second template selection input associating a second template module with the first result type, the second template module specifying a second template execution operation;
        after receiving the additional administrative input, receiving a second search request, the second search request requesting a list of resources in the first website that satisfy a second search string;

after receiving the second search request, determining that the first resource satisfies the second search string;

after determining that the first resource satisfies the second search string, sending a new dataset, the new dataset comprising a second content resource object that contains data regarding the first resource; and sending a second content generation script, the second content generation script comprising instructions to generate a second presentation string by performing the second template execution operation on the second content resource object, the second presentation string being renderable to present a second set of on-screen features describing the first resource.

6. The method of claim 1, wherein the administrative input associates a second template module with a second result type, the second template module specifying a second template execution operation;

wherein the method further comprising:

determining that a second resource satisfies the first search string, the second resource being among the resources of the first website; and determining that the first resource belongs to the second result type;

wherein the dataset comprises a second content resource object, the second content resource object containing data regarding the second resource; and wherein performance of the content generation script causes the second template execution operation to be performed on the second content resource object, a second presentation string being generated by performing the second template execution operation on the second content resource object, the second presentation string renderable to present a second set of on-screen features describing the second resource, the second set of on-screen features including at least one feature not present in the first set of on-screen features.

7. The method of claim 1, further comprising:

receiving a request for the first template module after sending the dataset; and sending the first template module in response to the request for the first template module.

8. The method of claim 1, wherein receiving the administrative input comprises receiving rule input, the rule input specifying a rule for the first result type; and wherein determining that the first resource belongs to the first result type comprises determining that the first resource satisfies the rule for the first result type.

9. The method of claim 8, wherein the rule for the first result type specifies a file name extension or a URL pattern; and wherein determining that the first resource satisfies the rule for the first result type comprises determining that a file name extension of the first resource corresponds to the file name extension specified by the rule for the first result type or determining that a URL of the first resource satisfies the URL pattern specified by the rule for the first result type.

10. The method of claim 8, wherein the method further comprises storing a first entry in a table, the table having a plurality rows and columns that define an array of cells, the array of cells including cells associated with the first entry, different cells associated with the first entry specifying different properties of the first result type, the properties of the first result type including a rule property and a template module property, the rule property specifying the rule for the first result type, the template module property specifying the first template module; and wherein determining that the first resource belongs to the first result type comprises accessing the first entry to retrieve additional data for the first result type, including retrieving one or more additional properties for display or one or more additional templates for rendering.

11. The method of claim 1, further comprising:

after receiving the first search request, determining that the first resource belongs to a plurality of applicable result types, the plurality of applicable result types including the first result type; and performing a conflict resolution operation to select the first result type from among the plurality of applicable result types to which the first resource belongs.

12. The method of claim 11, wherein the server system hosts a plurality of websites on behalf of a tenant, the plurality of websites organized as a scope hierarchy having multiple levels, the plurality of websites including the first website;

wherein the plurality of applicable result types includes the first result type and a second result type, the first result type associated with a first level of the scope hierarchy, the second result type associated with a second level of the scope hierarchy, the second level being higher in the scope hierarchy than the first level; and wherein performing the conflict resolution operation comprises: selecting the first result type instead of the second result type because the first result type is associated with a lower level in the scope hierarchy.

13. The method of claim 12, wherein the plurality of websites includes a second website in addition to the first website, the first website and the second website belonging to a first site group;

wherein the user interfaces includes a first type configuration interface and a second type configuration interface, the first type configuration interface being in an administrative interface for the first website, the second type configuration interface being in an administrative interface for the first site group;

wherein receiving the administrative input comprises:

receiving input from the first type configuration interface to configure the first result type to be applicable within the first website;

receiving input from the second type configuration interface to configure the second result type to be applicable within the first site group; and wherein the method further comprises:

receiving a second search request, the second search request requesting a list of resources in the second website that satisfy a second search string;

determining that a second resource belongs to the second result type, a second template module associated with the second result type, the second template module specifying a second template execution operation; and after determining that the second resource belongs to the second result type, providing a second dataset, the second dataset comprising a second content resource object, the second content resource object comprising data regarding the second resource; and providing a second content generation script, performance of the second content generation script causing the second template execution operation to be performed on the second content resource object, a second presentation string being generated by performing the second template execution operation on the second content resource object, the second presentation string being renderable to present a second set of on-screen features describing the second resource.

14. A server system comprising:
a data storage system that stores computer-executable instructions and resources of a first website, the first website hosted by the server system, the data storage system comprising one or more computer storage media, the one or more computer storage media not consisting of transitory signals; and
a processing system that reads the computer-executable instructions from the data storage system and executes the computer-executable instructions, execution of the computer-executable instructions by the processing system causing the server system to:
send admin interface data from the server system, the admin interface data representing one or more admin interfaces;
accept administrative input, the administrative input based on values set in controls in the admin interfaces, the administrative input associating a first template module with a first result type and associating a second template module with a second result type, the first template module specifying a first template execution operation, the second template module specifying a second template execution operation;
send search interface data from the server system, the search interface data representing a user interface that includes a search feature;
accept a first search request from a user, the first search request requesting a list of resources in the first website that satisfy a first search string, the first search string based on values set in the search feature;
determine that a first resource and a second resource satisfy the first search string, the first resource belonging to the first result type, the second resource belonging to the second result type;
send a dataset, the dataset comprising a first content resource object and a second content resource object, the first content resource object containing data regarding the first resource wherein the data regarding the first resource includes one or more properties designated by the result type for the first resource, the second content resource object containing data regarding the second resource wherein the data regarding the second content resource includes one or more properties designated by the result type for the second resource;
based on the determination of result types for the first and second resources, receive a request for the first and second template modules;
in response to the request for the first and second template modules, provide the first and second template modules; and
provide a content generation script, performance of the content generation script causing the first template execution operation to be performed on the first content resource object and causing the second template execution operation to be performed on the second content resource object, a first presentation string being generated by performing the first template execution operation on the first content resource object, a second presentation String being generated by performing the second template execution operation on the second content resource object, the first presentation string being renderable to present a first set of on-screen features describing the first resource, wherein the first set of on-screen features include the one or more properties designated by the first result type arranged as specified by the first template module, the second presentation string being renderable to present a second set of on-screen features describing the second resource, wherein the second set of on-screen features include the one or more properties designated by the second result type arranged as specified by the second template module.

15. The server system of claim 14, wherein execution of the computer-executable instructions by the processing system causes the server system to accept property selection input, the property selection input indicating applicable properties for the first result type;
wherein the first result type and the second result type use a first template module for display,
the applicable properties of the first result type including properties of resources used when filling slots in the first template module,
the applicable properties of the second result type including properties of resources used when filling slots in the second template module, and
wherein the slots indicate locations into which data based on content resource objects in the dataset can be filled.

16. The server system of claim 14, wherein the first template module comprises Hypertext Markup Language (HTML), cascading style sheet (CSS), and scripting data utilized in performing the first template execution operation.

17. The server system of claim 14, wherein the admin interface data is renderable by a web browser application to display the admin interfaces.

18. The server system of claim 14,
wherein the server system hosts a plurality of websites on behalf of a tenant, the plurality of websites including the first website and a second website;
wherein the admin interfaces includes a first type configuration interface and a second type configuration interface, the first type configuration interface being in an administrative interface for the first website, the second type configuration interface being in an administrative interface for the second website, the first result type associated with a rule for the first result type;
wherein the administrative input includes input from the first type configuration interface to configure the first result type to be applicable within the first website and includes input from the second type configuration interface to configure a third result type to be applicable within the second website, the third result type associated with a rule for the third result type and a third template module;
wherein execution of the computer-executable instructions by the processing system causes the server system to determine that the first resource belongs to the first result type by determining that the first resource satisfies the rule for the first result type;
wherein execution of the computer-executable instructions by the processing system causes the server system to:
accept a second search request, the second search request requesting a list of resources in the second website that satisfy a second search string;
determine that a third resource satisfies the second search string, the third resource being in the second website, the third resource satisfying the rule for the first result type;

determine that the third resource belongs to the third result type by determining that the third resource satisfies the rule for the third result type; and generate result data for the third resource, the result data for the third resource specifying the third template module and applicable properties of the third resource.

19. The server system of claim 14, wherein the first resource and the second resource are both word processor documents, slide presentation documents, webpages, PDF documents, spreadsheet documents, images, audio files, or video files.

20. A computer storage medium that stores computer-executable instructions, the computer storage medium not consisting of transitory signals, execution of the computer-executable instructions by a processing system of a server system causing the server system to:

host a plurality of websites on behalf of a tenant, the plurality of websites including a first website and a second website;

accept a first template selection input, the first template selection input, associating a first template module with a first result type, the first template module specifying a first template execution operation;

accept a second template selection input, the second template selection input associating a second template module with a second result type, the second template module specifying a second template execution operation;

accept a first search request, the first search request requesting a list of resources in the first website that satisfy a first search string;

determine that a first resource and a second resource satisfy the first search string, the first resource belonging to the first result type, the second resource belonging to the second result type;

generate a dataset, the dataset comprising a first content resource object and a second content resource object, the first content resource object containing data regarding the first resource wherein the data regarding the first resource includes one or more properties designated by the result type for the first resource, the second content resource object containing data regarding the second resource wherein the data regarding the second content resource includes one or more properties designated by the result type for the second resource;

send the first template module, the second template module, and the dataset;

provide a content generation script, performance of the content generation script causing the first template execution operation to be performed on the first content resource object and causing the second template execution operation to be performed on the second content resource object, a first presentation string being generated by performing the first template execution operation on the first content resource object, a second presentation string being generated by performing the second template execution operation on the second content resource object, the first presentation string being renderable to present a first set of on-screen features describing the first resource, wherein the first set of on-screen features include the one or more properties designated by the first result type arranged as specified by the first template module, the second presentation string being renderable to present a second set of on-screen features describing the second resource, wherein the second set of on-screen features include the one or more properties designated by the second result type arranged as specified by the second template module;

accept a third template selection input, the third template selection input associating a third template module with the first result type instead of the first template module;

receive a second search request, the second search request requesting a list of resources in the first website that satisfy a second search string;

determine that the first resource satisfies the second search string;

after determining that the first resource satisfies the second search string, providing a new dataset, the new dataset comprising a third content resource object, the third content resource object containing data regarding the first resource;

provide the third template module; and provide a second content generation script, performance of the second content generation script causing the second template execution operation to be performed on the third content resource object, a third presentation string being generated by performing the third template execution operation on the third content resource object, the third presentation string being renderable to present a third set of on-screen features describing the first resource, the third set of on-screen features being different than the first set of on-screen features, wherein the third set of on-screen features include the one or more properties designated by the third result type arranged as specified by the third template module.

* * * * *